(12) United States Patent
Nanba et al.

(10) Patent No.: US 8,152,963 B2
(45) Date of Patent: Apr. 10, 2012

(54) METHOD FOR MANUFACTURING A REGENERATED PARTICLE AGGREGATE

(75) Inventors: Hisao Nanba, Shikokuchuo (JP);
Masaaki Takahashi, Shikokuchuo (JP);
Junji Murata, Shikokuchuo (JP);
Hiroyuki Osumi, Shikokuchuo (JP);
Toshiaki Kawanabe, Shikokuchuo (JP);
Akira Takeda, Shikokuchuo (JP)

(73) Assignee: Daio Paper Corporation, Ehime (JP)

( * ) Notice: Subject to any disclaimer, the term of this patent is extended or adjusted under 35 U.S.C. 154(b) by 721 days.

(21) Appl. No.: 12/083,191

(22) PCT Filed: Oct. 6, 2006

(86) PCT No.: PCT/JP2006/320128
§ 371 (c)(1),
(2), (4) Date: Feb. 17, 2009

(87) PCT Pub. No.: WO2007/040281
PCT Pub. Date: Apr. 12, 2007

(65) Prior Publication Data
US 2009/0294083 A1    Dec. 3, 2009

(30) Foreign Application Priority Data

Oct. 6, 2005 (JP) ................... 2005-293953
Oct. 25, 2005 (JP) ................... 2005-310072
Dec. 28, 2005 (JP) ................... 2005-380280

(51) Int. Cl.
*C02F 1/02* (2006.01)
*D21F 1/66* (2006.01)

(52) U.S. Cl. ........................ 162/189; 210/928
(58) Field of Classification Search .................. 162/158, 162/181.4–181.7, 184, 189; 106/286.1, 286.5, 106/286.6, 287.17, 400, 461, 481–483, 486; 428/221, 357; 210/928
See application file for complete search history.

(56) References Cited

U.S. PATENT DOCUMENTS

| | | | |
|---|---|---|---|
| 3,704,158 A * | 11/1972 | Rohan ............... | 106/464 |
| 3,765,921 A * | 10/1973 | Puskar ............... | 106/457 |
| 4,567,030 A * | 1/1986 | Yuasa et al. ............... | 423/326 |
| 4,908,104 A | 3/1990 | Loomans et al. | |
| 5,846,378 A * | 12/1998 | Phipps ............... | 162/29 |
| 6,139,960 A * | 10/2000 | Styron et al. ............... | 428/402 |
| 6,159,381 A * | 12/2000 | Bleakley et al. ............... | 210/712 |
| 6,242,098 B1 * | 6/2001 | Styron et al. ............... | 428/402 |
| 2003/0159624 A1 * | 8/2003 | Kinuthia et al. ............... | 106/707 |

FOREIGN PATENT DOCUMENTS

| | | |
|---|---|---|
| JP | 54-14367 | 2/1979 |
| JP | 56-27638 | 6/1981 |
| JP | S63-500723 | 3/1988 |
| JP | H7-503027 | 3/1995 |
| JP | 11-310732 | 11/1999 |
| JP | 2001-011337 | 1/2001 |
| JP | 2001-026727 | 1/2001 |
| JP | 2001-262002 | 9/2001 |
| JP | 2002-275785 | 9/2002 |
| JP | 2002-308619 | 10/2002 |
| JP | 2003-49389 | 2/2003 |
| JP | 2003-119692 | 4/2003 |
| JP | 2003-119695 | 4/2003 |
| JP | 2004-176208 | 6/2004 |

* cited by examiner

*Primary Examiner* — Matthew Daniels
*Assistant Examiner* — Dennis Cordray
(74) *Attorney, Agent, or Firm* — DLA Piper LLP (US)

(57) ABSTRACT

The present invention aims at providing: a recycling usable regenerated particle aggregate; a method for allowing stable manufacture of the regenerated particle aggregate; a paper containing the regenerated particle aggregate, the paper exhibiting excellent property in case of newsprint papers, printing papers, book printing papers, and electrophotographic printing papers that use the regenerated particle aggregate, and especially a neutralized paper containing the regenerated particle aggregate; and a coated paper for printing having especially excellent printability, using the regenerated particle aggregate. Problems will be solved by: a regenerated particle aggregate obtained through dehydration, drying, calcination, and pulverization using a deinked froth discharged at a used paper deinking treatment process as a main raw material; a method for manufacturing the regenerated particle aggregate; a paper containing the regenerated particle aggregate as an internal filler; a coated paper for printing having a coating of the regenerated particle aggregate as a pigment for coating.

5 Claims, 1 Drawing Sheet

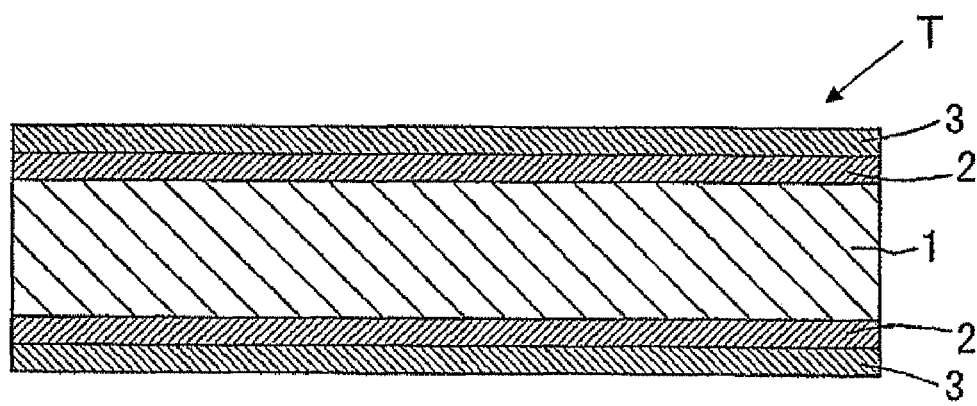

METHOD FOR MANUFACTURING A REGENERATED PARTICLE AGGREGATE

TECHNICAL FIELD

The present invention relates to a regenerated particle aggregate that has been regenerated through a dehydration process, a drying process, a calcined process, and a pulverization process, using deinked froth as main raw materials, a method for manufacturing the regenerated particle aggregate, a regenerated particle aggregate-containing paper containing the regenerated particle aggregate therein, and a coated paper for printing having the regenerated particle aggregate coated thereon.

BACKGROUND ART

In recent years, regeneration of used papers attracts more attention in the perspective of environmental protection, resource conservation, and garbage reduction. Today, used papers of newspapers, magazine papers, corrugated papers, etc. are mainly used as sources of used papers for raw materials of these regenerated papers. Recently, an activity for collection of waste office papers out of offices by the whole building is also found, thus the regeneration of the used papers is becoming more important technology.

Manufacturing recycled papers generates a large amount of paper sludge, such as deinked froth discharged from used paper treatment processes, wastewater and dehydration sludge discharged from respective paper manufacturing processes etc.

The paper sludge contains many inorganic substances, such as fillers applied to various papers, and pigments for coated layers of papers.

Conventionally, this paper sludge is burnt for volume-reduction, or landfill disposal. However, since the paper sludge contains a large amount of inorganic substances, burning of the paper sludge leaves a large amount of ash (inorganic substance), leading to a low effect in volume reduction. For this reason, the use of ash is intended as raw material of cement, soil conditioner and so on. However, in such use, a large amount of ash cannot be used, because the ash is merely served as an auxiliary agent. After all, most of ash is to be used for landfill disposal.

There can be a method for effective use of the ash as an internal filler of a paper as it is without any treatment. However, the ash cannot be used properly as the internal filler as it is without any treatment due to its low brightness.

Therefore, Patent Document 1 proposes a method, where before the use of ash, the ash is re-burnt for improving its brightness.

In the method described in Patent Document 1, however, when the ash is re-burnt, it is necessary to set the re-burning temperature at 500 to 900° C. for perfect burning of the unburnt carbon, which means that the brightness of the ash is improved only to about 50%. Thus, it has been known that it is not suitable for the ash to be used as filler in a paper. Furthermore, it has been found that when the re-burning temperature is set to be 900° C. or higher, the ash (inorganic substance) is sintered, molten and extremely hardened.

In addition, since the re-burnt ash has a very high hardness, when it is used as filler, abrasion of paper making wires advances quickly, thereby its lifetime is shortened very much, resulting in impossibility of actual application.

Against such defect, there can be a countermeasure such as decreasing the particle diameter of the re-burnt ash by pulverizing it for abrasion reduction and improvement in smoothness. Use of the ash as an internal filler, however, extremely decreases the retention in the paper making and raises the energy cost for grinding due to an extraordinary high hardness of the ash itself.

Patent Document 2 proposes a method of regeneration of inorganic substances contained in paper sludge as a pigment for paper making by supplying the paper sludge in a reactor containing an oxygen-containing gas introduced thereinto, and by oxidizing for 0.25 to 5 hours under a condition of 250 to 300° C. and about 3000 psig.

However, due to wet type air-oxidation treatment of paper sludge, this method may only provide insufficient removal of organic substances, a low brightness of the obtained pigment, and uneven particle diameters, and therefore the pigment is unsuitable for use as a filler and a pigment for paper making, leading to a complicated reaction operation and higher cost.

On the other hand, Patent Document 3 proposes a method, wherein after obtaining paper sludge charcoal by fumigation combustion of paper sludge, clay is formed as a raw material for paper making by further burning of the obtained charcoal by kiln. However, this method has a large disadvantage of failing in effective extraction of energy from the paper sludge due to fumigation combustion of the paper sludge, conversely needing input energy. Furthermore, the method has a large problem that the formed clay also has uneven large particle diameters, and cannot be used as a pigment for coating.

Moreover, as in Patent Document 4, a method of treatment by continuous drying, carbonization, and calcination of sludge formed in waste water treatment in a rotary kiln is also known. In this method, processes of granulation and molding before calcination are performed for obtaining uniform calcination. In continuous drying, carbonization, and calcination in the rotary kiln under a condition of 40 to 60% of solid concentration (in other words, 60 to 40% of moisture percentage) as described in an embodiment, compulsory treatment of the sludge particle advances by the rotation of the kiln irrespective of a situation of dried condition and carbonized condition. Accordingly, insufficient drying makes a large unburnt amount left in the particles, and causes imperfect calcination, and consequent reduction of the brightness. Conversely, excessive drying causes excess calcination, while allowing perfect calcination, and a high hardness of the obtained regenerated particles. As a result use of this regenerated particle disadvantageously causes wire abrasion in paper machines, and abrasion of a cutter blade in cutting of papers.

The biggest problem described in the preceding Patent Documents 1 to 4 in the case of use of the paper sludge as a raw material is in a mixed condition of a variety of paper sludge including paper sludge flown out through wires in a paper making process, paper sludge collected from the wastewater containing solid contents generated in a washing process in a pulping process, a solid content separated and collected with a solid content separation apparatus using precipitation or surfacing in a waste water treatment process, paper sludge after removal of mixed foreign matter in a used paper treatment process, etc.

In this situation, for example, the paper sludge flown out through wires in the paper making process contains intermingled paper strength additives etc., and therefore may have consequent variation in quality due to variation of paper milling materials in the paper making process.

The wastewater sludge may contain intermingled flocculants, and furthermore may have large variation in quality based on paper made products of the whole plant, the variation of the amount of production, washing within the process of the production facility, etc.

The paper sludge formed from the washing process in the pulping process may contain many substances that does not allow use of the paper sludge as various fillers and pigments caused by the variation of the chip moisture or the pulp manufacturing conditions, leading to variation in quality. The paper sludge formed from the washing in the pulping process has variation in quality depending on the chip moisture or pulp-manufacturing conditions as well as various substances which cannot be used as fillers or pigments and are mixed into the sludge.

Accordingly, use of all the paper sludge without selection causes large deterioration in quality of the fillers and pigments for paper making, and extremely large variation in quality, resulting in unstable product quality.

That is, each of any regenerated particles conventionally obtained by publicly known methods is merely collected as a paper making particle, and it cannot be used as a regenerated particle for paper making, because its quality is unsuitable and unstable.

[Patent Document 1] Japanese Patent Application Laid-Open No. 11-310732
[Patent Document 2] Japanese Patent Application Publication No. 56-27638
[Patent Document 3] Japanese Patent Application Laid-Open No. 54-14367
[Patent Document 4] Japanese Patent Application Laid-Open No. 2004-176208

DISCLOSURE OF THE INVENTION

Problems to be Solved by the Invention

The first object of the present invention is to provide a recycling-usable regenerated particle aggregate obtained through a predetermined dehydration process, drying process, calcined process, and pulverization process, using, as a main raw material, a large amount of deinked froth produced by growth of use of the used papers. The regenerated particle aggregate has excellent retention ability, bulkiness, surface-flatness, printability, and oil absorbability in the paper making.

The second object is to provide a method for allowing the stable production of the regenerated particle aggregate.

The third object is to provide a paper containing the regenerated particle aggregate, the paper exhibiting excellent property in the case of newsprint papers, printing papers, book printing papers, and electrophotographic printing papers that use the regenerated particle aggregate, and especially to provide a neutralized paper containing the regenerated particle aggregate.

The fourth object is to provide a coated paper for printing having especially excellent printability, using the regenerated particle aggregate.

Means for Solving the Problems

The present invention having solved the problems will be described hereinafter.

[Invention According to Claim 1]

A regenerated particle aggregate usable as a filler or pigment for paper making, wherein
the regenerated particle aggregate is obtained through dehydration, drying, calcination, and pulverization using a deinked froth discharged in a used paper deinking treatment process as a main raw material, and
the regenerated particle aggregate is adjusted to have the following composition.

(Composition)

In the regenerated particle aggregate, a particle component of the regenerated particle aggregate contains calcium, silicon, and aluminum at a mass proportion of 30 to 82.9 to 35.9 to 35 respectively in terms of oxides, and the proportion of total content of the calcium, the silicon, and the aluminum out of the particle component of the regenerated particle aggregate is not less than 90 mass % in the component of the regenerated particle aggregate.

The deinked froth, as used herein, in the present invention represents a component separated from pulp fibers mainly in a deinking process for removing inks attached to used papers in their treatment process for producing recycled pulp.

(Operation Effect)

Since the regenerated particle aggregate of the present invention is obtained by calcination of a material using deinked froth as a main raw material, that is, the deinked froth is used as a raw material, a problem of increase in waste is not caused, and furthermore, inexpensive raw materials may reduce manufacturing costs.

The regenerated particle aggregate of the present invention has excellent compatibility to binders or dispersants, in the case of addition to coating liquids as a pigment for coating. Since it has excellent dispersive property in a high concentration, the strength of the coated layer is improved.

Since the regenerated particle aggregate of the present invention contains many voids, it has higher oil absorbability, and therefore addition of the regenerated particle aggregate into a coating liquid as an internal filler or as a pigment for coating gives excellent ink adherability, leading to improved printability.

Since the regenerated particle aggregate of the present invention contains calcium not less than 30 mass proportion in terms of oxides, a paper containing this regenerated particle aggregate has a higher brightness.

Calcium carbonate has polymorphic modifications, such as calcite crystal (calcite) in a hexagonal system, and aragonite crystal (aragonite) in an ortho rhombic system, most of naturally-occurring limestone is of a calcite system, and seashells have aragonite crystal other than calcite crystal. Furthermore, the calcium carbonate has a vaterite system that does not exist naturally. Calcium obtained out of the deinked froth has variable systems, and the calcinated aggregation contributes to the stability of quality of the inorganic micro particle itself, and may give inorganic micro particles with almost stabilized property, while it is agglomerate formed of different components.

The regenerated particle aggregate of the present invention contains silicon, and it has a high optical refractive index owing to the fine particles thereof. Accordingly, a paper, containing, as filler, the regenerated particle aggregate of the present invention containing silicon not less than 9 mass proportion in terms of oxides exhibits higher opacity.

Furthermore, fine particles of the silicon improve affinity with water-soluble adhesives, such as binders, or water-soluble auxiliaries. Therefore inclusion, in a coating liquid as a pigment for coating, of the regenerated particle aggregate of the present invention containing silicon not less than 9 mass proportion in terms of oxides improves absorptivity and drying property of printing inks.

Since the regenerated particle aggregate of the present invention contains silicon not more than 35 mass proportion in terms of oxides, it exhibits flowability and the stability of solids concentration, i.e., high dispersibility also in use as a pigment for coating. This is because that formation of the regenerated particle aggregate restricts the high water absorptivity of the silicon.

The regenerated particle aggregate of the present invention contains aluminum not less than 9 mass proportion in terms of oxides. This aluminum has a principal original source in aluminum in a clay, trivalent aluminum sulfate octadecahydrate added as an auxiliary agent in a paper making process, and aluminum contained in a talc as an impurity. This aluminum exhibits extremely high cationicity of the original aluminum, and it improves bonding strength with anionic pulp fibers as compared with conventional inorganic fillers exhibiting anionicity, leading to improved retention and chemical adherablity.

Since the regenerated particle aggregate of the present invention contains aluminum not more than 35 mass proportion in terms of oxides, stable dispersibility in pulp suspensions (pulp slurries) or coating liquids without coating liquid shock possibly caused by excessive cationicity may be obtained.

Furthermore, since the regenerated particle aggregate of the present invention contains calcium, silicon, and aluminum at a mass proportion of 30 to 82.9 to 35.9 to 35 in terms of oxides, and the proportion of total content of the calcium, the silicon, and the aluminum is not less than 90 mass %, and the regenerated particle aggregate of the present invention is porous, it has a small specific gravity and suppresses excessive aqueous solution absorption. For this reason, the regenerated particle aggregate of the present invention exhibits high dispersibility in pulp suspensions and coating liquids (pulp slurries), and it forms a bulky coating layer and paper layer, and easily retains in the paper.

[Invention According to Claim 2]

The regenerated particle aggregate according to claim 1, having an oil absorbency based on JIS K 5101 of 30 to 100 ml/100 g.

(Operation Effect)

The regenerated particle aggregate of the present invention has an oil absorbency according to the method of JIS K 5101 of 30 to 100 ml/100 g. When the oil absorbency of the regenerated particle aggregate of the present invention, containing calcium, silicon, and aluminum at a mass proportion of 30 to 82.9 to 35.9 to 35 in terms of oxides, and having the proportion of total content of the calcium, the silicon, and the aluminum of not less than 90 mass %, is less than 30 ml/100 g, the regenerated particle aggregate of the present invention exhibits a small ink absorbing effect, providing a low effect of preventing print through. The oil absorbency not less than 100 ml/100 g gives a running of printing parts, or lowered printing quality, leading to a poor printing glossiness.

[Invention According to Claim 3]

The regenerated particle aggregate according to claim 1 or 2, having an average particle diameter by the Coulter counter method of 0.1 to 10 μm.

(Operation Effect)

The regenerated particle aggregate of the present invention has an average particle diameter by the Coulter counter method of 0.1 to 10 μm. Taking the influence on dispersibility, abrasiveness, brightness, lightness, and opacity into consideration, this range of the average particle diameter of 0.1 to 10 μm is limited in the case of use as internal fillers and pigments for coating in paper making.

Since the regenerated particle aggregate of the present invention is an agglomerate having an average particle diameter not less than 0.1 μm, it has excellent retention in high-speed paper making exceeding 1300 m/minute in recent years, advantageously providing excellent covering property of a paper layer as a pigment for coating. Furthermore, since the regenerated particle aggregate of the present invention has an average particle diameter not more than 10 μm, it reduces a problem of generation of streak in a high-speed coating, advantageously providing less amount of generation of paper dust. In addition, in use of a regenerated particle aggregate having an average particle diameter not more than 0.1 μm as a pigment for coating of a coated paper, the regenerated particle aggregate raises the viscosity of the dispersion liquid upon dispersing the pigment for coating in water or an aqueous solution of a binder in preparation of a coating liquid, resulting in difficulty in sufficient rise of the pigment concentration of the coating liquid. Furthermore, the writability and surface strength of an ink jet recording sheet also decrease. On the other hand, an average particle diameter larger than 10 μm may cause unevenness on the surface of the coated layer, deteriorate touch of the paper surface, and also provide a poor roundness of an ink dot.

The regenerated particle aggregate is subjected to grain-fining to an average particle diameter of 0.1 to 10 μm by wet dispersion using a dispersing machine after slurrying by addition of a dispersant. In this case, the average particle diameter is preferably set to, for example, a range of 0.3 to 5 μm as a pigment for coating, and of 0.5 to 10 μm as an internal filler corresponding to application of the inorganic particle to be obtained.

[Invention According to Claim 4]

The regenerated particle aggregate according to any one of claims 1 to 3, wherein a peak height of the average particle diameter in a differentiation curve of a particle size distribution by the Coulter counter method is not less than 30%.

(Operation Effect)

The peak height of the average particle diameter in the differentiation curve of the particle size distribution by the Coulter counter method is preferably not less than 30%. The particle size distribution of the regenerated particle aggregate preferably has the peak height in the differentiation curve of not less than 30%, more preferably not less than 35%, and it preferably has a half of peak width not more than 5 μm. A peak height not less than 30% and a half width preferably not more than 5 μm in a differentiation curve represent a narrower (sharp) particle size distribution. Inorganic particles having a narrower particle size distribution advantageously gives a clearer printing part, and a higher definition image. Conversely, a peak height and a half width dropping out of the above-described range will give (wider particle size distribution), poorer definition, and more indistinct image.

Furthermore, the most preferable differentiation curve has one peak, and it may have one or more peaks as long as it is not more than 5%. However, a differentiation curve having two or more peaks allows partial mixture of sections with poorer definition, providing a more indistinct image as compared with a case of one peak.

[Invention According to Claim 5]

A method for manufacturing a regenerated particle aggregate usable as a filler or pigment for paper making, the regenerated particle aggregate being obtained through a dehydration process, a drying process, a calcined process, and a pulverization process of a main raw material using a deinked froth separated from a pulp fiber in a deinking process of manufacturing recycled pulp as the main raw material, wherein a moisture percentage of the raw material after the dehydration process is set to 2 to 20 mass % in the drying process, and the calcined process includes at least two steps of calcined processes of a first stage calcining furnace of a cyclone type, and a second stage calcining furnace following the first stage calcining furnace, the second stage calcining furnace having a furnace temperature lower than a temperature in a top portion of the first stage calcining furnace.

[Invention According to Claim 6]

The method for manufacturing a regenerated particle aggregate according to claim 5, wherein not less than 70 mass % of an inorganic particle before the calcined process by the first stage calcining furnace is set to a particle diameter of 355 to 2000 μm.

[Invention According to Claim 7]

The method for manufacturing a regenerated particle aggregate according to claim 5 or 6, wherein an unburnt amount is set to 5 to 30% in burning and calcination in the first stage calcining furnace, and the unburnt amount is burnt and calcined in the second stage calcining furnace following the first stage calcination furnace.

[Invention According to Claim 8]

The method for manufacturing a regenerated particle aggregate according to any one of claims 5 to 7, wherein the temperature in the top portion of the first stage calcining furnace is set to 510 to 750° C., the temperature of the second stage calcining furnace is set lower than the temperature in the top portion of the first stage calcining furnace, and the temperature of the second stage calcining furnace is set to 500 to 700° C.

[Invention According to Claim 9]

The method for manufacturing a regenerated particle aggregate according to claim 5, wherein at least a pair of rolls for mixing up a raw material, and hot air spraying means for spraying hot air upwards are provided as drying means in the drying process.

(Operation Effect)

Operation effects obtained by adoption of the aspects according to claims 5 to 9 will be described hereinafter.

Use of the deinked froth as a main raw material may provide raw materials for manufacturing inorganic particles having much more stable quality as compared with the use of the sludge generated in other processes, such as industrial liquid waste process and adjustment process for raw materials of paper making.

The dehydrate obtained by dehydration of the deinked froth in the drying process is strongly and roughly picked by tangible means with a pair of rolls for mixing the dehydrates, and is gently and finely picked by intangible means for blowing hot wind upwards from between the pair of rolls. In this way, the grain arrangement of the dehydrate to have various properties, such as sizes and hardness may be possible, providing stable control of the moisture percentage and grain arrangement.

Especially the dehydrate is dried so that the moisture percentage of the dried material before the calcined process may preferably give 2 to 20 mass %. On one hand, drying to a moisture percentage in the range of less than 2 mass % may cause a problem of over burning in the following calcined process. On the other hand, drying of the dehydrate to a moisture percentage in the range exceeding 20 mass % may not allow reliable calcination in the following step.

The grain arrangement of the dried material before the calcined process is adjusted so that the particles having particle diameters of 355 to 2000 Mm may give not less than 70 mass %. Not less than 70 mass % of the particles having particle diameters not less than 355 μm to 2000 μm, that is, removal of the dried material containing smaller particles avoids partial over burning, allowing uniform calcination. Accordingly, the method is advantageous for the possibility of utilization from the standpoint of uniform quality of the inorganic particle to be obtained.

The calcined process preferably includes two steps of calcined processes of a first stage calcining furnace of a cyclone type, and a second stage calcining furnace following the first stage calcining furnace, the second stage calcining furnace having a furnace temperature lower than a temperature in a top portion of the first stage calcining furnace.

The calcination in the calcining furnace is preferably performed so that the unburnt percentage may give 5 to 30 mass %. The unburnt percentage less than 5 mass % gives a harder surface by over burning of the surface of the particles in calcination to cause insufficient oxygen within the particles, leading to a problem of reduction of the brightness of the inorganic particle. On the other hand, the calcination giving the unburnt percentage exceeding 30 mass % causes a problem of remaining of the unburnt amount after the following burning and calcination. Furthermore, the burning and calcination is performed to give over burning in the surface of the particles, in order to avoid remaining of this unburnt amount, resulting in a problem of hardening of the surface of the inorganic particle.

It is preferable that the burning temperature in the top portion of the first stage calcining furnace is set to 510 to 750° C., that the temperature of the second stage calcining furnace is set lower than the temperature of the top portion of the first stage calcining furnace, and that the temperature of the second stage calcining furnace is set to 500 to 700° C. The unburnt amount can be burned by setting the temperature in the second stage calcining furnace 10 to 50° C. lower than the temperature in the top portion of the first stage calcining furnace, while avoiding over burning on the surface of microscopic particles for paper making.

[Invention According to Claim 10]

A paper containing a regenerated particle aggregate manufactured from a pulp containing a filler, the filler using a deinked froth discharged from a used paper treatment process as a main raw material, wherein the regenerated particle aggregate is obtained from the main raw material through a dehydration process, a drying process, a calcined process, and a pulverization process, the regenerated particle aggregate is added to the pulp to have a content of 1 to 30 mass % as a paper ash content, and the regenerated particle aggregate is adjusted to have a hot water extract PH measured according to JIS P 8133 (1976) of 6.0 to 9.5, and to give the following composition.

(Composition)

In the regenerated particle aggregate, a component of the regenerated particle aggregate contains calcium, silicon, and aluminum at a mass proportion of 30 to 82.9 to 35.9 to 35 respectively in terms of oxides, and the proportion of total content of the calcium, the silicon, and the aluminum out of the component of the regenerated particle aggregate is not less than 90 mass % in the component of the regenerated particle aggregate.

(Operation Effect)

Since the regenerated particle aggregate of the present invention contains calcium not less than 30 mass proportion in terms of oxides, the brightness of the paper containing the regenerated particle aggregate becomes higher.

Since the regenerated particle aggregate of the present invention contains silicon, and particles of silica containing the silicon are fine, a high optical refractive index is exhibited. Therefore, the paper containing, as a filler, the regenerated particle aggregate of the present invention containing the silicon not less than 9 mass proportion in terms of oxides exhibits high opacity.

The regenerated particle aggregate of the present invention contains aluminum not less than 9 mass proportions in terms of oxides. This aluminum has a principal original source in aluminum in a clay, trivalent aluminum sulfate octadecahydrate added as an auxiliary agent in a paper making process, and aluminum contained in a talc as an impurity. This aluminum exhibits extremely high cationicity of the original aluminum, and it improves bonding strength with anionic pulp fibers as compared with conventional inorganic fillers exhibiting anionicity, leading to improved retention and chemical adherablity.

Since the regenerated particle aggregate of the present invention contains aluminum not more than 35 mass proportion in terms of oxides, stable dispersibility in pulp suspensions (pulp slurries) without coating liquid shock possibly caused by excessive cationicity may be obtained.

Since the regenerated particle aggregate is manufactured so that the hot water extract PH measured according to JIS P 8133 (1976) may give 6.0 to 9.5, preferably 6.0 to 8.8, elution of calcium carbonate existing in the regenerated particle aggregate is avoided, and the shape of the regenerated particle aggregate is stabilized. Furthermore, generation of calcium hydroxide, pollution in the paper making process system, and scale are suppressed, and degradation of papers is suppressed, leading to recycling of resources as a raw material for paper making.

Moreover, large-scale use of the recycled pulp based on progress of conservation of resources in recent years generates adhesive foreign matters by resin contents with increase in the mechanical pulp contained in the recycled pulp. Although, the resin component may be comparatively separated from fiber components especially in a neutral area, addition of the regenerated particle aggregate also exhibits effect of suppression of growth of adhesive foreign matters and generation of deposit, owing to the porosity of the regenerated particle aggregate.

[Invention According to Claim 11]

A paper containing a regenerated particle using a regenerated particle aggregate covered with a silica as an internal filler, the regenerated particle aggregate covered with a silica having the following composition as an internal filler, wherein a component of the regenerated particle of the regenerated particle aggregate covered with a silica has a composition of calcium, silicon, and aluminum of 30 to 62.29 to 55.9 to 35 in terms of oxides at a mass proportion by elemental analysis.

(Operation Effect)

Precipitation of calcium, silicon, and aluminum of 30 to 62.29 to 55.9 to 35 in terms of oxides at a mass proportion on the surface of the regenerated particle may improve oil absorbability and opacity.

[Invention According to Claim 12]

A coated paper for printing having a coating layer with a pigment and a binder as an essential component formed at least on one side of the coated paper, wherein the coated paper for printing containing a regenerated particle aggregate as the pigment is obtained by dehydration, drying, calcination, and pulverization, using a deinked froth discharged in a used paper deinking treatment process, as a main raw material, and the regenerated particle aggregate is adjusted to have the following composition by an elemental analysis with an X-ray microanalyser of the surface of the coated paper.

(Composition)

A particle component of the regenerated particle aggregate contains calcium, silicon, and aluminum at a mass proportion of 20 to 82.10 to 40.8 to 40 in terms of oxides, and the proportion of total content of the calcium, the silicon, and the aluminum out of the component of the regenerated particle aggregate is not less than 90 mass % in the component of the regenerated particle aggregate.

(Operation Effect)

According to this embodiment, use of the regenerated particle aggregate containing calcium, silicon, and aluminum for the uppermost surface coating layer that greatly influences printability may provide high affinity with binders, and an improved surface strength of the coating layer, and allow formation of the coating layer having excellent cushioning properties, resulting in excellent printability. Here, the calcium provides improvement in the brightness, the aluminum provides an intense cationicity, and the silicon provides an ink absorbency and ink drying property.

In the coated paper for printing of the present invention, the proportion of total content of aluminum, silicon, and calcium in terms of oxides in the regenerated particle aggregate is preferably not less than 90% by weight. The proportion of total content of aluminum, silicon, and calcium in terms of oxides not less than 90% by weight allows sufficient exhibition of efficacy as a pigment containing each element of aluminum, silicon, and calcium.

[Invention According to Claim 13]

The coated paper for printing coated by the regenerated particle aggregate according to claim 12, wherein the regenerated particle aggregate in the coating layer has an average particle diameter of 0.1 to 10 μm by the Coulter counter method.

(Operation Effect)

In the coated paper for printing of the present invention, the regenerated particle aggregate in the coating layer preferably has an average particle diameter of 0.1 to 10 μm by the Coulter counter method. In this case, the comparatively flexible regenerated particle aggregate is evenly combined with the shape of other pigments in the coating layer in a flattening treatment, and the unevenness and wave of the coating layer surface originating in the pigments are reduced, thereby leading to further flatness of the surface of the coating layer.

Effect of the Invention

The present invention provides a recycling-usable regenerated particle aggregate obtained through a predetermined dehydration process, drying process, calcined process, and pulverization process, using, as a main raw material, a large amount of deinked froth produced by growth of use of used papers. This regenerated particle aggregate has excellent retention ability, bulkiness, surface-flatness, printability, and oil absorbability in paper making.

Secondly, the present invention can provide a method for allowing stable manufacture of the regenerated particle aggregate.

Thirdly, the present invention can provide a paper containing the regenerated particle aggregate, the paper exhibiting excellent property in case of newsprint papers, printing papers, book printing papers, and electrophotographic printing papers that use the regenerated particle aggregate, and especially can provide a neutralized paper containing the regenerated particle aggregate.

Fourthly, the present invention can provide a coated paper for printing having especially excellent printability, using the regenerated particle aggregate.

BRIEF DESCRIPTION OF THE DRAWINGS

FIG. 1 is a schematic sectional view showing a coated paper for printing according to one embodiment of the present invention.

EXPLANATION OF REFERENCE NUMERALS

1. Paper base
2. Under side coating layer
3. Upper side coating layer (uppermost surface coating layer)
T. Coated paper for printing

BEST MODE FOR CARRYING OUT THE INVENTION

Hereinafter, various embodiments of the invention will be described in detail.
<Regenerated Particle Aggregate and Method for Manufacturing the Regenerated Particle Aggregate>

The regenerated particle aggregate of the present invention is manufactured through a dehydration process, a drying process, a calcined process, and a pulverization process. Furthermore, an aggregation process and a granulation process of a deinked froth may be provided therein and a classification process etc. between each process may also be provided.

The manufacturing facility of the regenerated particle aggregate preferably has various sensors for control of conditions of processed materials or equipments, and processing speeds, etc.

Hereinafter, the regenerated particle aggregate using the deinked froth according to the present invention as a main raw material will be described with reference to production processes in further detail. Here, as long as the deinked froth is used as a main raw material, other paper sludge, such as paper sludge in the paper making process may be used in combination.

[Raw Material]

In a process of manufacturing recycled pulps, selection and screening of the used paper to be used are performed to obtain the used paper having fixed quality in order to continuously manufacture the recycled pulp with stable quality.

Therefore, fundamentally constant kinds, proportion, and amount of inorganic substances will be incorporated in the recycled pulp manufacturing process. Furthermore, even in the case where the used paper contains plastics, such as vinyl polymers and films that may give variable factors in unburnt materials in a method of producing the inorganic particle, these foreign matters may be removed in preceding stages before the deinking process for obtaining the deinked froth. Accordingly, the deinked froth may provide raw materials for manufacturing inorganic particles having extremely more stable quality, as compared with sludge generated in other processes, such as industrial liquid waste process and an adjustment process for paper making raw materials.

[Dehydration Process]

Publicly known dehydration means may be suitably used for dehydration of the deinked froth. In an example in the embodiment, a rotary screen that is an example for dehydration means separates water from the deinked froth. In the rotary screen, the deinked froth dehydrated to a water content of 95 to 98% is preferably sent to a screw press to be further dehydrated to a water content of 40% to 70%.

As described above, operation of dehydration of the deinked froth in a multistage process and avoidance of rapid dehydration may suppress flowing out of inorganic substances, and may avoid excessive hardness of flocks of the deinked froth. Although auxiliary agents such as flocculating agents for aggregation of the deinked froth may be added for improving dehydration efficiency in the dehydrating treatment, it is preferred to use the flocculating agents without any content of iron. Content of iron may cause a problem of reduction of brightness, caused by oxidation of the iron, of the regenerated particle aggregate.

The dehydration process of the deinked froth preferably adjoins to the process of manufacturing the regenerated particle aggregate according to the present invention in respect of manufacturing efficiency. Alternatively, the equipment may be provided adjoining to the recycled pulp manufacturing process beforehand, and the materials after dehydration may also be transported.

[Drying Process]

The dehydrate obtained by dehydration of the deinked froth is transported by transportation means such as a truck, a conveyor belt, etc. to a volumetrical feeder, and then is supplied to the drying device therefrom.

This drying device includes a drying container to which the dehydrate is supplied, a pair of rolls, equipped in the bottom of this drying container, for mixing up the supplied dehydrate, and hot air spraying device for blowing upward hot wind from between the pair of rolls. Furthermore, the hot air spraying device may have a configuration wherein a feed channel is connected to the bottom of the drying container, and hot wind is blown into the drying container through this feed channel.

The drying device strongly and roughly picks the dehydrate by tangible means as a pair of rolls, in addition, weakly and minutely picks by intangible means as hot wind, and thereby attains stable control of moisture percentage, and grain arrangement of the dehydrate having various properties of sizes and hardness.

Especially, when the dehydrate supplied in the drying container is dehydrated so as to give a moisture percentage 40 to 70 mass %, the temperature of the hot wind is preferably set as 100 to 200° C., more preferably 120 to 180° C., and especially preferably 130 to 170° C. On one hand, when the moisture percentage of the dehydrate gives 40 to 60 mass %, sufficient drying may be attained even at a temperature of 100° C. of hot wind. On the other hand, the temperature of hot wind is preferably set as not more than 200° C. Since drying may advance quickly than grain arrangement of the dehydrate having various sizes and hardness, the temperature more than 200° C. of the hot wind may make difficult achievement of uniformity of the moisture percentage between the surface and inside of the particle.

The dehydrate is dried so as to give the moisture percentage before the calcined process preferably of 2 to 20 mass %, more preferably of 3 to 15 mass %, and especially preferably of 3 to 10 mass %. Drying providing the moisture percentage of the dehydrate in a range of less than 2 mass % causes a problem of over burning in the following calcination. Maintenance to 2 to 20 mass % of the moisture percentage of the raw material before the calcined process may not cause a problem of over burning easily in the following calcination. On the other hand, the drying of the dehydrate giving the moisture percentage in a range exceeding 20 mass % may not allow following reliable calcination.

In grain arrangement of the dried material, the particles having a particle diameter of 355 to 2000 μm is preferably adjusted to give not less than 70 mass %, more preferably not less than 75 mass %, and especially preferably not less than 80 mass %.

Furthermore, production of the dried material so as to give not less than 70 mass % of particles with a particle diameter of 355 μm to 2000 μm, that is, removal of the dried material of particles having a smaller diameter may avoid partial over burning, leading to uniform calcination. Therefore, the measure is useful for possibility of practical use, in viewpoint of uniform quality of the inorganic particles.

Furthermore, classification after drying allows reliable removal of the dried material of particles having a smaller diameter, improving treatment efficiency.

[Calcined Process]

The dried material passes through a transfer channel, is accelerated with an air fan equipped in the course of this transfer channel, and then is sent to the first stage calcining furnace and the second stage calcining furnace in a cyclone type.

The first stage calcining furnace suppresses grain-fining of the particles by rotational fall of the dried material, and calcines the dried material in this process, to adjust the amount of the unburnt materials.

The calcination in the first stage calcining furnace is controlled so that the unburnt percentage may preferably give 5 to 30 mass %, more preferably 8 to 25 mass %, and especially preferably 10 to 20 mass %. Calcination giving an unburnt percentage less than 5 mass % in the first step calcining furnace causes over burning of the surface of the particle in calcination, and raises the hardness of the surface, and simultaneously also causes insufficient oxygen content within the particles, leading to a problem of reduction of brightness of the regenerated particle aggregate. On the other hand, calcination giving an unburnt percentage exceeding 30 mass % in the first stage calcining furnace may cause a problem of remaining of the unburnt amount after the following second stage burning and calcination, and furthermore a problem of increase of the hardness of the surface of the inorganic particle due to burning and calcination (up to a stage) of over burning on the surface of the particles for prevention of remaining of the unburnt amount.

The shape of the first stage calcining furnace is not in particular limited, but it is preferred to be of a cyclone type. The shape of the cyclone type enables uniform and reliable adjustment of the unburnt percentage by suppressing grain-fining of the particles as mentioned above.

In adjustment of the range of the burning temperature, the temperature of the top portion of the calcining furnace is preferably set as 510 to 750° C. in the first stage calcining furnace, and the temperature of the second stage calcining furnace is preferably set at a temperature lower than the temperature of the top portion of the first stage calcining furnace, that is, 500 to 700° C.; the temperature of the top portion of the first stage calcining furnace is more preferably set as 550 to 730° C., and the temperature of the second stage calcining furnace is preferably set at a temperature lower than the temperature of the top portion of the first stage calcining furnace that is, 510 to 680° C.; and the temperature of the top portion of the first stage calcining furnace is especially preferably set as 580 to 700° C., and the temperature of the second stage calcining furnace is especially preferably set at a temperature lower than the temperature of the top portion of the first stage calcining furnace that is, 550 to 660° C. Setting of the temperature of the top portion of the first stage calcining furnace as 600 to 680° C., and setting of the temperature in the second stage calcining furnace at temperature lower than the temperature of the top portion of the first stage calcining furnace, that is, 580 to 650° C. can provide the suitable regenerated particle aggregate for use as an internal filler or a pigment for coating.

Setting in the second stage calcining furnace at a temperature being 10 to 50° C. lower than that of the top portion of the first stage calcining furnace can burn the unburnt material, while avoiding over burning of the surface of the regenerated particle aggregate.

The calcined material obtained with the first stage calcining furnace is transported to the second burning and calcination furnace that is the second burning step, and is subjected to burning and calcination. Publicly known apparatuses such as a rotary kiln furnace, a fluidized bed furnace, a Stoker furnace, a cyclone furnace, a half carbonization and negative pressure furnace etc. may be used, as the second burning and calcination furnace. Since this furnace allows uniform incineration with agitation, and without an excessive physical pressure, under an environment with little temperature variation, a rotary kiln furnace is preferred in the present invention.

[Pulverization Process]

In the method for manufacturing the regenerated particle aggregate concerning the present invention, the regenerated particle aggregate may be suitably fine-granulated to a necessary particle diameter by further using publicly known dispersion/pulverization processes, if necessary, for use as an internal filler, or a pigment for coating.

In an example, the regenerated particle aggregate obtained after incineration may be pulverized using dry mills, such as a jet mill and a high speed rotating mill, or wet mills, such as an attritor, a sand grinder, and a ball mill. Use for application of internal fillers and pigments for coating needs equalization and grain-fining of the particle diameter, and the optimal particle diameter in applications of an internal filler and a pigment for coating using the regenerated particle aggregate obtained by the method based on the present invention has an average particle diameter of 0.1 to 10 μm.

[Silica Deposition Process]

Although the regenerated particle aggregate concerning the present invention may be used as an internal filler and a pigment for coating without any post treatment by passing through the pulverization process, further precipitation (fixing) of silica onto the regenerated particle aggregate, if necessary, may improve function as a regenerated particle aggregate.

Examples for precipitating silica to the regenerated particle aggregate will be described hereinafter. In a suitable measures for precipitating silica, the regenerated particle aggregate is added into an alkaline aqueous solution of silicic acid and then dispersed therein to prepare a slurry, and subsequently the slurry is maintained at a predetermined pressure with heating and agitation, at a solution temperature of 70 to 100° C., preferably within airtight container. Then a silica sol is formed by addition of an acid and the PH value of the final reaction liquid is adjusted to the range of 8.0 to 11.0. In this way, the silica may be precipitated on the surface of the regenerated particle aggregate. The silica that precipitates on the surface of the regenerated particle aggregate is a silica sol particle with a particle diameter of 10 to 20 nm obtained by reaction, at a high temperature, of a diluted solution of mineral acids, such as sulfuric acid, hydrochloric acid, and nitric acid, and sodium silicate (water glass) as a raw material through a hydrolysis reaction and a polymerization of silicic acid.

The silica sol micro particle having a particle diameter of about several nanometers formed by addition of acids, such as dilute sulfuric acid, to a solution of sodium silicate is made to attach so as to cover the whole porous surface of the regenerated particle aggregate. Accompanying the growth of the silica sol, bonds will be formed between the silica sol micro particle on the surface of inorganic micro particles, and silicon, calcium and aluminum that are contained by the regenerated particle aggregate, leading to precipitation of the silica on the surface of the regenerated particle aggregate.

The PH value is in the range of neutral to weak alkaline state, and the PH value is preferably in the range of 8 to 11. Addition of sulfuric acid until PH gives acidic conditions less than 7 will not form silica sol, but will form white carbon.

Although an alkaline solution of silicic acid, as used herein, is not especially limited, sodium silicate solution (No. 3 water glass) is preferred in consideration of easy availability. The concentration of the alkaline solution of silicic acid is preferably 3 to 10 mass % as a content of silicic acid in the aqueous solution (in terms of $SiO_2$). The concentration exceeding 10 mass % may not give a form of silica sol to the silica precipitated on the regenerated particle aggregate, but may give a white carbon, and further prevents the porous shape of the regenerated particle aggregate, providing low improvement effect of opacity and oil absorbability. Furthermore, the concentration less than 3 mass % reduces the amount of silica components in the regenerated particle aggregate, and makes difficult precipitation of the silica on the surface of the regenerated particle aggregate.

In case of the regenerated particle aggregate covered with the silica having the silica that has been precipitated onto the surface of the regenerated particle aggregate, the mass proportion of calcium, silicon, and aluminum of 30 to 62.29 to 55.9 to 35, in terms of oxides, can improve oil absorbability and opacity caused by the precipitation effect of the silica.

[Supplementary Process]

In the manufacturing facility, classification is preferably performed for uniformly arranging the particle size of the regenerated particle aggregate in each process in order to obtain further stabilization of quality, and further stabilization of quality may be achieved by feedback of coarser particles or finer particles to the preceding process.

Furthermore, granulation of the deinked froth after passing the dehydrating treatment is preferably performed in a preceding stage of the drying process, moreover, classification for uniformly arranging the particle size of the agglomerated material is more preferably performed, and thus further stabilization of quality may be achieved by feedback of coarser particles or finer particles to the preceding process. Publicly known facilities for granulation may be used, and facilities such as rotating type, agitation type, extrusion type are preferred.

In the manufacturing facility, foreign matters other than the regenerated particle aggregate are preferably removed. For example, sands, plastics foreign matters, metals, etc. are preferably removed, in respect of removal efficiency, using a pulper, a screen, a cleaner, etc. in the stages before the deinking process of the recycled pulp manufacturing process.

Since iron, by oxidation, is a substance that causes reduction of whiteness of the micro particles, avoidance and removal of mixing of iron are especially recommended. The design using materials other than iron in each process or the design using lining method is preferred. Thus, preferred are avoidance of mixing of iron by abrasion etc. into the system, and further removal of iron by dispose of high magnetic substances such as magnets in the facilities of drying and classification etc.

The regenerated particle aggregate concerning the present invention is characterized by containing calcium, silicon, and aluminum at a mass proportion of 30 to 82.9 to 35.9 to 35 in terms of oxides, preferably at a mass proportion of 40 to 82.9 to 30.9 to 30, and more preferably at amass proportion of 60 to 82.9 to 20.9 to 20.

Adjustment of the raw material composition in the deinked froth is a principal method, as methods for adjusting the proportion of calcium, silicon, and aluminum in terms of oxides of the regenerated particle aggregate in the calcined process. However, adjustment by device of addition of the coating froth coming from definite source, or the adjustment process froth into the process using spray etc., and device of addition of incinerator scrubber lime in the drying and classification process and calcined process is also possible.

For example, wastewater sludge of a neutral paper making system and wastewater sludge of a coated paper manufacturing process are suitably used for adjustment of calcium in the regenerated particle aggregate, wastewater sludge of a newsprint paper production system added as an opacity improver in a large amount is suitably used for adjustment of silicon, and wastewater sludge of paper making system using aluminum sulfate, such as in an acid paper making system, and wastewater sludge in a paper of fine quality paper making process of using a large amount of talc are suitably used for adjustment of aluminum.

In more preferable adjustment of silica, after dispersion of the regenerated particle aggregate in an alkaline aqueous solution of alkaline silicate, the PH value is adjusted in a neutralized range of 7.0 to 9.0 by addition of mineral acids to the dispersion liquid, leading to precipitation of the silica, originated from the silicic acid, on the surface of the regenerated particle aggregate.

The regenerated particle aggregate of the shape has, for example, 30 to 100 ml/100 g of oil absorption, and the average particle diameter thereof is preferably adjusted to 0.1 to 10 μm in use for an internal filler in a paper making process.

The regenerated particle aggregate concerning the present invention is preferably treated so that it may already have not less than 90% of particles having a particle diameter not more than 40 μm using the drying, classification, and calcination processes, before the grinding treatment process. This method enables one-step grinding treatment in a wet type process without grinding treatment in multi stages such as conventionally and generally performed pulverization of larger particles by dry grinding and wet grinding for obtaining finer particles.

This method can give a peak height not less than 30% of an average particle diameter in the differentiation curve of the particle size distribution by the Coulter counter method. Furthermore, adjustment to the mass proportion of calcium, silicon, and aluminum as 30 to 82.9 to 35.9 to 35 in terms of oxides in the deinked froth may provide the pore volumes of the regenerated particle aggregate of 0.15 to 0.60 cc/g, the pore surface area of 10 to 25 $m^2/g$, and the pore radius of 300 to 1000 angstrom.

In use for application of internal fillers and pigments for coating, equalization and grain-fining of the particle diameter are necessary, and wholehearted studies about the optimal particle diameter and diameter of pigment of the regenerated particle aggregate concerning the present invention, such as in application of internal fillers and pigments for coating has led to a finding that the regenerated particle aggregate of the shape preferably has an average particle diameter of 0.1 to 10 μm.

<Paper Containing the Regenerated Particle Aggregate>

The regenerated particle aggregate may be added to pulp raw materials to obtain a paper containing the regenerated particle aggregate.

Recycled pulp may be used as a pulp raw material used for this paper containing the regenerated particle aggregate, and the used paper of the raw material includes a newspaper used paper, printing used paper, magazine used paper, the OA used paper, etc. In addition, the virgin pulp may also be used, and the pulp has no limitation of broadleaf tree materials and needle-leaf tree materials, and these two kinds of pulp obtained from both raw materials may be blended at any proportion. Furthermore, manufacturing methods also include kraft pulps (KP), and sulphite pulps (SP) that are the chemical pulps obtained by delignification by digestive liquor; and mechanical pulps such as mechanically ground pulps (GP), refiner groundwood pulps (RGP), thermomechanical pulps (TMP), chemithermomechanical pulps (CTMP), chemiground pulps (CGP), and semichemical pulps (SCP). The paper containing the regenerated particle aggregate may be manufactured by mixing of these pulps and the regenerated particle aggregates.

The above-described regenerated particle aggregate may also be used independently and the regenerated particle aggregate and at least one kind of internal filler selected from inorganic fillers such as heavy calcium carbonate, precipitated calcium carbonate, talc, clay, kaolin, titanium dioxides, synthetic silica, aluminum hydroxide etc. that are usually used as internal fillers, and synthetic macromolecule micro particles, such as polystyrene resins and formaldehyde resins etc. may be used in combination. Of course, use in combination with two or more of the above-mentioned fillers is also possible. Since the proportion of addition of the fillers exceeding 40% containing the regenerated particle aggregate lowers the paper strength, the regenerated particle aggregate of 1 to 30 mass % is preferably contained as a paper ash content in the paper, and more preferably 5 to 25 mass %.

Publicly known additives may be used as additives to be added in the pulp slurry. For example, paper strength additives include starches, vegetable gums, aqueous cellulose derivatives, sodium silicate, etc.; sizing compounds include rosins, starches, CMC (carboxylmethyl cellulose), polyvinyl alcohols, alkyl ketene dimer, ASA (alkenyl succinic anhydride), neutral rosins, etc.; and retention improvers include polyacrylamides and copolymers thereof, sodium silicate, etc. Furthermore, coloring matters, such as dyestuffs and pigments, may also be added if needed. Pulps prepared in this way may be subjected to paper milling using publicly known paper machines.

The basis weight of the paper containing the fillers is not in particular limited. Since the expected effect by use of the regenerated particle aggregate concerning the present invention is notably exhibited, the range of the basis weight is, in general, preferably about 10 to 350 g/m². It is, of course, possible to add to a thick paper having basis weight exceeding this range such as a cardboard and card.

Addition of the regenerated particle aggregate may be carried out at any conventionally and publicly known steps, and it is preferably performed between the raw material blending chest and the inlet. Addition during this step allows easy dispersion into the regenerated particle aggregate, and thus improves fixability to fiber, resulting in improved retention of the fillers. Since the regenerated particle aggregate does not disturb bonds between the fibers, reduction of stiffness of the base paper may be avoided. It is more preferred to add at a closer process of the inlet as much as possible for more uniform dispersion of the regenerated particle aggregate and improvement in the fixability to the fibers.

<Coated Paper for Printing Having Coating of the Regenerated Particle Aggregate>

The present invention provides a coated paper for printing having a coating layer which contains a pigment and a binder as essential components and is formed at least on one side of the paper. The coating layer contains the regenerated particle aggregate adjusted so as to have following composition as a pigment. The regenerated particle aggregate is obtained through dehydration, drying, calcination, and pulverization processes using deinked froth, discharged in a deinking treatment process for used papers, as a main raw material. The present invention also provides a coated paper for printing coated with the regenerated particle aggregate having the following composition by an elemental analysis using an X-ray microanalyser for the surface of the coated paper.

(Composition)

The particle component of the regenerated particle aggregate contains calcium, silicon, and aluminum at a mass proportion of 20 to 82.10 to 40.8 to 40 respectively in terms of oxides, preferably at a mass proportion of 40 to 82.10 to 30.9 to 30, and the proportion of total content of the calcium, the silicon, and the aluminum out of the component of the regenerated pigment is not less than 90 mass % in terms of oxides in the regenerated particle aggregate.

As shown in FIG. 1, in a preferable example of a coated paper for printing coated by this regenerated particle aggregate, the coated paper for printing T has a paper base 1; under side coating layers 2 formed on the both sides of the paper base 1, respectively; and upper side coating layers (uppermost surface coating layers) 3 formed on each under side coating layers 2, respectively.

The paper base 1 is not in particular limited, but various kinds of publicly known paper bases may be used. In detail, the paper base 1 may be only a base paper consisting of single layer, and it may be a paper base having a multilayer structure of not less than two layers obtained by layering a different kind of or the same kinds of base papers together. Mechanical pulps, kraft pulps, and regenerated pulps, for example, are advantageously used as principal raw materials for raw material pulps of the base paper. In addition, publicly known non-wood pulps, such as kenafs, bamboos, hemps, and straws may also be used in combination. These pulps may be used independently, or in combination with two or more kinds. The basis weight of the base paper is not in particular limited, and the base paper having, for example, about 40 to 130 g/m² of basis weight may be suitably used. Suitable methods such as a twin wire former machine, a long net machine, an on-line machine allowing continuous processing of processes from the base paper up to formation of the coating layer, and furthermore up to the surface treatment of coating layer etc. are suitably applied as paper making methods of the base paper.

Each under side coating layer 2 is formed, respectively, using a coating liquid (hereinafter referred to as "coating liquid for under side coating layer") for formation of the under side coating layer 2 having a pigment and an adhesive as principal components.

Suitable pigments used for the coating liquid for under side coating layer includes inorganic pigments such as calcium carbonate (heavy calcium carbonate, precipitated calcium carbonate), delaminated clay, calcinated clay, satin white, titanium dioxides, aluminum hydroxide, zinc oxide, barium sulfate, calcium hydroxide, calcium sulfate, calcium sulfite, magnesium carbonate, magnesium hydroxide, bentonite, sericite, silica, talc, activated clay etc.; and organic pigments such as polystyrene resin micro particles, urea formalin resin micro particles, minute hollow particles, and porous particles.

These pigments may be used independently, or in combination of two or more kinds. Especially, calcium carbonate and clay are preferred. The pigments are used at a suitable proportion giving a solid concentration of the coating liquid about 50 to 70%.

Furthermore, adhesives used for the coating liquid for under side coating layer is not in particular limited, but water-soluble adhesives may be used suitably. In detail, the water solubility adhesives include starches, such as oxidized starches, cationic starches, esterified starches, and dextrin; synthetic resin adhesives, such as polyvinyl alcohol (PVA); proteins, such as casein, soybean proteins, and synthetic proteins etc. Incidentally, there may be used conjugated diene copolymer latexes, such as styrene butadiene copolymers; acrylic copolymer latexes, such as polymers of acrylic esters, or copolymers thereof; vinyl polymer latexes, such as ethylene-vinyl acetate copolymers; and alkali soluble, alkali swelling, or alkali insoluble polymer latexes obtained by modification by functional group containing monomers, such as carboxyl group, of these polymer latexes. These adhesives may be used independently, or in combination of two or more kinds. The mixing proportion of the adhesive is suitably set based on kinds of the adhesive to be used, and is generally preferably set within the range of 5 to 30 parts by weight with respect to pigment 100 parts by weight. The reason is that an excessively small amount of the mixing proportion of the adhesive may possibly not give designated adhesive strength, and conversely, an excessive mixing proportion may have adverse influence on the coating property.

Various kinds of conventionally publicly known auxiliary agents may suitably be blended to the coating liquid for the under side coating layer, such as dispersants, tackifiers (thickeners), lubricants, antifoaming agents, water resistant additives, colorants, pH adjusters, etc. other than each of the above-described components according to the purpose of use and needs.

The upper side coating layers (uppermost surface coating layer) 3 formed on each of the above-described under side coating layers 2, respectively, are formed using a coating liquid for formation of the upper side coating layers 3 (hereinafter, referred to as "coating liquid for the upper side coating layer") having pigments and binders as principal components.

The pigment blended with the coating liquid for the upper side coating layer contains, as components of the particle, the regenerated particle aggregate so as to give calcium, silicon, and aluminum at a proportion of 20 to 82.10 to 40.8 to 40 in terms of oxides in elemental analysis by an X-ray microanalyser of the surface of the coated paper.

When clay is used as other pigments, a pigment obtained by blending of equivalent amount of calcium carbonate and clay, by weight, may be used as a standard pigment, and heavy calcium carbonate and clay having a mixing ratio by weight is set within the range of 3.7 to 7.3 can especially advantageously provide an excellent degree of printing glossiness and outstanding operability, further leading to production at lower costs for the coated paper for printing.

Thus, the average particle diameter of the regenerated particle aggregate in the upper side coating layer (uppermost surface coating layer) 3 is set within the range of 0.1 to 10 μm, and furthermore the comparatively flexible regenerated particle aggregates are evenly combined with shapes of other pigments in the upper side coating layer 3 in flattening treatment, resulting in reduction of unevenness and wave of the surface of upper side coating layer 3 originating in the pigments. In this way, further flatness of the surface of the upper side coating layer 3 may be achieved.

Various kinds of conventional publicly known binders may be used, as binders to be blended into the coating liquid for the upper side coating layer, and styrene-butadiene latex may especially suitably be used. In addition to the binders, other adhesives may suitably be blended such as starches, as oxidized starches, cationic starches, and dextrin; synthetic resin adhesives, such as polyvinyl alcohols (PVA); proteins, such as casein, soybean protein and synthetic proteins etc.

In various kinds of styrene butadiene latexes, preferable are latexes that does not contain acrylonitrile as a monomer component or, that, if contains, contains acrylonitrile not more than 10% by weight, and the latexes preferably has a glass transition temperature (Tg) of $-30$ to $0°$ C., an average particle diameter of 100 to 170 nm, and a gel content of 80 to 90%. The reason is that latexes containing many amount of acrylonitrile as a monomer component easily turn yellow in the surface treatment process and also with the passage of time, and therefore have difficulty in weather resistance, exhibiting tendency of development of variation in color tone in final products. However, since containing of acrylonitrile as a monomer component has, while reducing mixed amounts of the latex in the coating liquid, advantage of providing surface hardness necessary for the coated paper for printing T, and moreover of increase of the degree of printing glossiness, a small amount of content not more than 10% by weight will be allowed in order to obtain these advantages. When these are taken into consideration, latexes having the content of acrylonitrile of 1 to 10% by weight, and more preferably 3 to 8% by weight are used. Such predetermined latexes may be obtained by suitable polymerization of monomer components such as butadiene, acrylonitrile, styrene, acrylic acid, butyl acrylic acid, methacrylic acid, methyl methacrylic acid, vinyl acetate, etc.

Incidentally, latexes having a glass transition temperature (Tg) within the range of $-30$ to $0°$ C. are preferred. The reason is that the glass transition temperature (Tg) exceeding $0°$ C. has a tendency of deterioration of stickiness-proof property, and of lowering of operability. In more detail, a larger amount of content of acrylonitrile as a monomer component can suppress deterioration of stickiness-proof property even though the glass transition temperature (Tg) is high, but since the latex concerned does not contain acrylonitrile or contains only a small amount of acrylonitrile, it is difficult for the latex to suppress deterioration of stickiness-proof property when the latex does not have a lower glass transition temperature (Tg). On the other hand, the glass transition temperature (Tg) lower than a temperature of $-30°$ C. only give the improvement effect of almost equivalent stickiness-proof property as in a case with the glass transition temperature (Tg) of $-30°$ C. For this reason, the glass transition temperature (Tg) is preferably set in the above-mentioned range. The glass transition temperature (Tg) may be obtained from a characteristic curve with a differential scanning calorimetry apparatus (DSC) of the 20 mg of a film under conditions of heating rate of $5°$ C./minute, and a measurement temperature of 0 to $100°$ C., the latex film having been manufactured at $20°$ C., 65% (relative humidity).

Furthermore, the average particle diameter of the latex is preferably within the range of 100 to 170 nm. The reason is that there is a tendency for the average particle diameter less than 100 nm to lower the coating property, and to worsen the covering property, and conversely for the average particle diameter more than 170 nm to exhibit neither sufficient adhesive strength nor surface strength, but to deteriorate stickiness-proof property. In other words, the average particle diameter in the above-mentioned range advantageously provides the adhesive strength necessary as the coated paper for printing T, and the surface strength, and simultaneously allows guarantee of excellent coating property. The average particle diameter may be obtained by diluting the latex to give a concentration of 0.05 to 0.2%, by measuring each of the diluted latex for an absorbance at a wavelength of 525 nm, and by using a calibration curve prepared beforehand.

The latex preferably has a gel content within the range of 80 to 90%. The reason is that there is shown a tendency for the gel content less than 80% to give an insufficient surface strength, and to cause lowered operability. On the other hand, the gel content higher than 90% hardly gives difference to the improvement effect of stickiness-proof property as compared with a case at 90%. The gel content is an index of the adhesive strength, and the gel content set within a high range as 80 to 90% enables guarantee of the necessary surface strength, even in the case where the latex does not contain acrylonitrile for giving the surface strength to the coated paper for printing T or where it contains only a small quantity. The gel content is a value calculated by the following expression (1).

$$\text{Gel content (\%)} = (\text{dried film weight} - \text{toluene soluble weight}) \times 100 / \text{dry film weight} \quad (1)$$

where, a dry film weight represents a weight of a dry film obtained by spreading about 0.3 g of latex thin on a slide glass, and by drying to give a film in a dryer at 50° C.; a toluene soluble weight is a value obtained by immersing the obtained dried film in an about 50 ml of toluene during a whole day and night, by filtering with a glass filter, by separating into a filtrated material and a filtrate, by drying this filtrate in a dryer at 105° C., and by measuring for a weight of toluene soluble component.

The mixing proportion of the above-described predetermined latex is preferably set within the range of 8 to 15 parts by weight with respect to the pigment 100 parts by weight. That is, an excessively small amount of the mixed amounts provides an adhesive strength and the surface strength insufficient needed for the coated paper for printing T, and tends to cause picking trouble (separation of coated layer) in the case of printing by users. Conversely, an excessive amount of the mixed amount causes an abundant absolute quantity of the acrylonitrile in the coating liquid, and tends to cause deterioration of weather resistance, and a problem of rise in manufacturing costs. In other words, the above-described value within the range of the mixing proportion of the above-described predetermined latex can provide the coated paper for printing T excellent in weather resistance etc., while securing a necessary minimum adhesive strength and a surface strength. However, improvement in the adhesive strength and surface hardness by using other adhesives besides the predetermined latex in combination may, of course, also be employable. Especially, esterified starches, such as urea phosphorylated starches and carbamic acid starches are preferably used together with the predetermined latexes. The mixing proportion of the esterified starches preferably is set within the range of 0.5 to 10 parts by weight to the pigment 100 parts by weight.

In addition to each of the above-described components, various kinds of conventionally publicly known auxiliary agents such as acrylic acid-acrylamide copolymers, dispersants, thickeners, lubricants, antifoaming agents, water resistant additives, colorants, pH adjusters, etc. may suitably be blended to the coating liquid, according to the purpose of use or needs. Especially, the acrylic acid-acrylamide copolymers may be preferably blended within the range of 0.01 to 0.1 parts by weight with respect to the pigment 100 parts by weight. The amount of addition of the acrylic acid and acrylamide copolymers added in the coating layer of the uppermost surface is preferably in the range of 0.01 to 0.1% by weight to the pigment 100 parts by weight, and especially preferably in the range of 0.04 to 0.08% by weight, though depending on application methods, application speeds, or viscosity before addition of the compound. The amount of addition less than 0.01% by weight of the compound gives insufficient tackifing effect, and cannot provide a uniform face. The amount of addition exceeding 0.1% by weight provides excessive tackifing effect, and makes the application liquid exhibit significant stringiness, and therefore it deteriorates operability and causes unstable spread of the coating, leading to non-uniform face.

The coated paper for printing concerning the embodiment, for example, can be manufactured as follows. That is, a paper base 1, a coating liquid for under side coating layer, and a coating liquid for the upper side coating layer are prepared firstly, and the coating liquid for under side coating layer is coated to both sides of the paper base 1 with a predetermined coating amount. Here, the coating treatment can be performed using various kinds of publicly known coating apparatuses, such as blade coaters, bar coaters, roll coaters, air knife coaters, reverse roll coaters, and curtain coaters. Subsequently, the material coated is dried with various kinds of drying by heating methods using publicly known hot wind heating, steamy heating, infrared heater heating, gas heater heating, electric heater heating, etc. The conditions of drying are suitably adjusted according to the drying by heating method, the blending of the coating liquid for under side coating layer, etc. Incidentally, a treatment for smoothing the surface by breaking the fine irregularities caused at the time of coating and drying may be performed, if needed after the drying treatment, using various kinds of publicly known smoothing treatment apparatuses, such as heat soft calenders and super calenders. In this way, an under side coating layer having a thickness about 5 to 25 µm may be formed. Subsequently, after coating of the coating liquid for the upper side coating layer with a predetermined coating amount in the same manner on the under side coating layer 2 formed on both sides of the paper base 1, the coating layer is dried. Then, by smoothing treatment, an upper side coating layer (uppermost surface coating layer) 3 having a thickness about 5 to 25 µm is formed.

As the coating treatment, the drying treatment, and the smoothing treatment, suitable methods may be adopted according to the blending of the coating liquid for the upper side coating layer, etc. In this way, the coated paper for printing T concerning the embodiment can be obtained.

The present invention is not limited to the above-described embodiments. For example, the under side coating layer 2 and the upper side coating layer 3 may be formed only on one side instead of on both sides of the paper base 1. Alternatively, the coating layer may have not only two layers of the under side coating layer 2 and the upper side coating layer 3, but may have multilayer structure. Moreover, the coating layer may be only one layer of the upper side coating layer 3 without the under side coating layer 2. In that case, the uppermost surface is formed by a coating liquid containing the regenerated particle aggregate with aluminum, silicon, and calcium at a proportion of 8 to 40.10 to 40.20 to 82 in terms of oxides, as the particle component, in an elemental analysis by X-ray microanalyser on the surface of the coated paper. The coated paper for printing of the present invention may be used as various kinds of printing papers, such as offset printing.

EXAMPLES

Hereinafter, in order to describe the present invention in more detail, examples will be described, but the present invention is not intended to be limited to these examples.

<Regenerated Particle Aggregate>

The production examples of the regenerated particle aggregate are shown in Table 1, and the regenerated particle aggregate were evaluated for physical property. For some of them, the regenerated particle aggregates were added to raw material pulps of BPGW (30 mass %), NBKP (30 mass %), LBKP (25 mass %), and DIP (15 mass %) according to Table 2 to obtain papers having a basis weight of 64 g/m². The papers were evaluated for the physical properties. Evaluation methods are represented below.

(1) Measurement of oil absorbency. According to JIS K 5101.
(2) Measurement of average particle diameter and particle size distribution. 10 mg of samples were added into methanol solutions 8 ml. The sample was dispersed with an ultrasonic dispersing machine (output of 80 W) for 3 minutes. Measurement of this solution was carried out using a Coulter counter size distribution measuring device (COULTER ELECTRONICS TA-II type) with a 50-μm aperture. However, for samples that cannot be measured with the 50-μm aperture, measurement was carried out using 200-μm aperture. ISOTON II (trade name; COULTER ELECTRONICS, 0.7% of high purity NaCl aqueous solution) was used as an electrolyte.
(3) Brightness by Hunter. According to J. Tappi No. 69
(4) Hunter opacity. According to J. Tappi No. 70
(5) Ash content. According to JIS P 8251 (temperature of 525° C.)
(6) Paper dust. Paper dust was visually judged when 20 sheets of cut specimen having B5 size were bundled and were shaken lightly 5 times on a black vinyl sheet.

⊚. no paper dust observed
○. almost no paper dust
Δ. paper dust observed
X. much paper dust observed

TABLE 1

| Production example of inorganic particle | | CaO Mass % | SiO₂ Mass % | Al₂O₃ Mass % | Sum total content Mass % | Oil absorbency cc | Average particle diameter μm | Peak height % |
|---|---|---|---|---|---|---|---|---|
| Production example | 1 | 30 | 35 | 35 | 95 | 100 | 0.1 | 35 |
| Production example | 2 | 40 | 30 | 30 | 95 | 40 | 0.5 | 35 |
| Production example | 3 | 50 | 25 | 25 | 95 | 43 | 1.0 | 30 |
| Production example | 4 | 60 | 20 | 20 | 90 | 44 | 1.0 | 35 |
| Production example | 5 | 60 | 20 | 20 | 95 | 45 | 2.0 | 40 |
| Production example | 6 | 60 | 20 | 20 | 98 | 45 | 3.0 | 43 |
| Production example | 7 | 60 | 20 | 20 | 95 | 50 | 4.0 | 40 |
| Production example | 8 | 60 | 31 | 9 | 95 | 53 | 5.0 | 35 |
| Production example | 9 | 60 | 9 | 31 | 95 | 55 | 7.0 | 35 |
| Production example | 10 | 82 | 9 | 9 | 95 | 30 | 10.0 | 35 |
| Production example | 11 | 60 | 20 | 20 | 95 | 25 | 1.9 | 35 |
| Production example | 12 | 60 | 20 | 20 | 95 | 110 | 2.2 | 35 |
| Production example | 13 | 60 | 20 | 20 | 95 | 45 | 11.3 | 35 |
| Production example | 14 | 60 | 20 | 20 | 95 | 120 | 5.0 | 25 |
| Production example | 15 | 60 | 20 | 20 | 95 | 23 | 5.0 | 35 |
| Comparative production example | 16 | 25 | 50 | 25 | 85 | 46 | 0.1 | 35 |
| Comparative production example | 17 | 90 | 5 | 5 | 95 | 56 | 0.4 | 35 |
| Comparative production example | 18 | 60 | 20 | 20 | 85 | 46 | 0.4 | 35 |
| Comparative production example | 19 | 60 | 35 | 5 | 95 | 56 | 7.0 | 35 |
| Comparative production example | 20 | 60 | 5 | 35 | 95 | 43 | 11.0 | 35 |
| Comparative production example | 21 | 25 | 25 | 50 | 95 | 24 | 12.0 | 35 |
| Comparative production example | 22 | 25 | 50 | 25 | 95 | 26 | 13.0 | 35 |

TABLE 2

| | | Production example of inorganic particles | Amount of addition kg/t | Density g/cm³ | Brightness % | Opacity % | Ash content % | Paper dust |
|---|---|---|---|---|---|---|---|---|
| Example | 1 | 2 | 30 | 1.152 | 86.7 | 88.7 | 10.2 | ⊚ |
| Example | 2 | 4 | 30 | 1.153 | 86.8 | 87.6 | 10.1 | ⊚ |
| Example | 3 | 6 | 30 | 1.154 | 87.1 | 87.6 | 10.1 | ⊚ |
| Example | 4 | 7 | 30 | 1.155 | 87.2 | 87.4 | 10.2 | ⊚ |
| Example | 5 | 9 | 30 | 1.153 | 86.9 | 87.8 | 10.2 | ⊚ |
| Example | 6 | 10 | 30 | 1.154 | 86.9 | 87.7 | 10.2 | ○ |
| Example | 7 | 13 | 30 | 1.147 | 87.5 | 87.8 | 9.9 | ○ |
| Example | 8 | 15 | 30 | 1.145 | 85.4 | 87.2 | 9.8 | ○ |
| Comparative example | 1 | Comparative 19 | 30 | 1.188 | 86.3 | 86.6 | 9.3 | X |
| Comparative example | 2 | Comparative 20 | 30 | 1.176 | 85.8 | 86.2 | 9.2 | X |
| Comparative example | 3 | Comparative 21 | 30 | 1.212 | 84.7 | 87.1 | 9.4 | Δ |

TABLE 2-continued

| | Production example of inorganic particles | Amount of addition kg/t | Density g/cm³ | Brightness % | Opacity % | Ash content % | Paper dust |
|---|---|---|---|---|---|---|---|
| Comparative example 4 | Comparative 22 | 30 | 1.158 | 84.8 | 86.9 | 9.1 | X |

Next, the regenerated particle aggregate based on the present invention and the regenerated particle of comparative examples were added to pure water 200 g based on Table 3. The solution was sufficiently dispersed using HOMODISPER SL (trade name. made by IPROS CORPORATION). An aqueous solution 200 g having 10 of concentration of polyvinyl alcohol (PVA Kuraray R-1130) was added, and mixed. This coating liquid was coated using a bar coater (No. 60) to a paper of fine quality having a basis weight of 80 g/m². Flattening treatment was performed to the paper with a pilot super calender to obtain a recording paper. Table 3 represents the properties of these recording papers.

Evaluation methods will be described hereinafter.
(7) Clearness of printing line part. The clearness of the printing line part was visually evaluated for.
◉. blot and blur not observed
○. blot observed, but acceptable for use
Δ. blot observed clearly
X. many blots and blurs observed
(8) Beck smoothness. According to JIS P 8119
(9) White paper glossiness. According to JIS P 8142, using a gloss meter by Murakami Color Research Laboratory.
(10) Degree of printing glossiness. A face having a solid printing performed thereon with an RI printability testing machine (product made by AKIRA Works) using 0.4 ml of an ink for offset printing was measured with a gloss meter manufactured by Murakami Color Research Laboratory.
(11) Print through of ink. The back side of the paper after printed was visually evaluated for.
◉. blot to the back side not observed
○. blot to the back side observed, but acceptable for use
Δ. blot to the back side clearly observed
X. many blots on the back side observed
(12) Recorded image evaluation. Solid printing was performed onto the recording paper obtained above with an ink for offset printing using an RI printability testing machine (made by AKIRA WORKS), and the recording paper was evaluated for the consistency of the printed image. Print was given on the recording paper using a PIXUS9900i printer manufactured by Canon, Inc., and the print was evaluated for the printing image for the roundness of dot, absorptivity of the ink, and writability. The recording paper was evaluated for the surface strength with a cellophane tape.
a. Consistency evaluation of printed image for printing density. The consistency of the printed image for the printing density was measured in Macbeth RD918.
b. Printed image for the roundness of dot. Dot was observed using a magnifying lens.
A. percentage of the dots similar to round-shape is not less than 95%
B. not less than 70% and less than 90%
C. less than 70%
c. Absorptivity of ink. A magenta ink 0.5 microliter was removed from the ink cartridge of the PIXUS9900i manufactured by Canon, Inc., and then the ink was dropped onto a paper surface by a micro syringe from a height of 1 cm. A period of time until the ink was completely absorbed was measured for.
d. Writability. Writing with an HB pencil.
○. similar writability as that for a paper for copy
Δ. a little inferior writability, but acceptable
X. almost impossible to be written with
e. Surface strength. Peeling state of the coating layer by cellophane tape was evaluated for.
○. almost no separate (enough surface strength)
Δ. separated
X. quite separated (small surface strength).

TABLE 3

| | Production example of inorganic particle | Amount of addition of inorganic particle Part | Printing part clearness | Smoothness of coating surface Second | White paper glossiness % | Printing glossiness % | Print through of ink |
|---|---|---|---|---|---|---|---|
| Example 9 | 1 | 25 | ○ | 580 | 54.1 | 54.5 | ○ |
| Example 10 | 3 | 30 | ○ | 585 | 54.5 | 55.5 | ○ |
| Example 11 | 5 | 35 | ◉ | 620 | 54.1 | 55.1 | ◉ |
| Example 12 | 8 | 40 | ◉ | 615 | 53.9 | 54.8 | ○ |
| Example 13 | 11 | 45 | ○ | 605 | 54.2 | 55.5 | ◉ |
| Example 14 | 12 | 25 | ○ | 578 | 54.2 | 54.8 | ○ |
| Example 15 | 14 | 30 | Δ | 581 | 54.1 | 54.3 | ○ |
| Comparative example 5 | Comparative 16 | 25 | X | 550 | 50.2 | 53.2 | X |
| Comparative example 6 | Comparative 17 | 30 | X | 560 | 51.5 | 52.5 | X |

TABLE 3-continued

| | | | | | | | | |
|---|---|---|---|---|---|---|---|---|
| Comparative example | 7 | Comparative 18 | 35 | X | 564 | 50.4 | 53.5 | Δ |

| | | Brightness % | Paper dust | Printing record consistency | Dot roundness | Ink absorbing time Second | Writability | Surface strength |
|---|---|---|---|---|---|---|---|---|
| Example | 9 | 82.2 | ◎ | 1.88 | B | 9.4 | ○ | ○ |
| Example | 10 | 82.3 | ◎ | 1.86 | A | 9.2 | ○ | ○ |
| Example | 11 | 82.6 | ○ | 1.87 | A | 10.4 | ○ | ○ |
| Example | 12 | 84.8 | ○ | 1.85 | A | 12 | ○ | ○ |
| Example | 13 | 82.4 | ○ | 1.86 | A | 9.2 | Δ | Δ |
| Example | 14 | 82.5 | ◎ | 1.86 | B | 13.9 | ○ | ○ |
| Example | 15 | 82.5 | ○ | 1.88 | B | 13 | Δ | Δ |
| Comparative example | 5 | 81.1 | ○ | 1.75 | C | 15.4 | Δ | ○ |
| Comparative example | 6 | 82.1 | Δ | 1.78 | C | 17.1 | Δ | Δ |
| Comparative example | 7 | 81.8 | Δ | 1.83 | B | 18.6 | X | Δ |

Advantages by the present invention may be easily understood with reference to examples and comparative examples.

That is, in the evaluation of the retention ability, samples containing calcium, silicon, and aluminum at a mass proportion of 30 to 82.9 to 35.9 to 35 in terms of oxides, and having the proportion of total content not less than 90 mass % of the calcium, the silicon, and the aluminum show the high ash contents in the ash content in Table 2, giving high retention ability in the paper.

In bulkiness, as is shown in Table 2, the regenerated particle aggregate of the present invention show a lower density in spite of a high ash content as compared with the case by the regenerated particle obtained by comparative production example with the same amount of addition, thus clearly presenting bulkiness effect of the production examples of the present invention.

As is clear also from the results of Table 3 showing evaluation in case of use as a pigment to the coating layer in order to determine effect of the regenerated particle aggregate by the present invention, the regenerated particle aggregate by the present invention has more excellent surface-flatness, printability, and oil absorbability as compared with the case by the regenerated particle of comparative production example.

<Method for Manufacturing Regenerated Particle Aggregate>

Inorganic particles obtained by varying the factors were evaluated for the quality. Table 4 shows the results.

Evaluation of the quality was performed as follows.

(13) Productivity evaluation. Dehydration efficiency of raw materials, productivity, and electric power necessary for pulverization were evaluated for in four steps.
◎. the best efficiency
○. good efficiency
Δ. problems occurred in water efficiency, productivity, or pulverization
X. actual operation difficult

(14) Degree of wire wearing. The degree of plastics wire wearing (Nippon Filcon, 3 hours) was measured for by 2% by weight of slurry concentration.

(15) Stability of quality. Each of the micro particles obtained by predetermined method was measured for each item of brightness, particle diameter, quantity of production at a definite period of time of interval. Ranking was performed in an order giving less variation.
◎. up to the highest 5th rank
○. from the 6th rank to the 10th rank
Δ. from 11th rank to the 13th rank
X. less

(16) Appearance. The color of the inorganic micro particles was visually compared, and was classified into white class and gray class.

(17) Mass proportion. The mass proportion having a diameter more than 2000 μm was evaluated by a sieve of 4.7 meshes, and the mass proportion less than 355 μm was evaluated by a sieve of meshes.

(18) Particle diameter. The particle diameter was measured with an X-ray microanalyser (EMAX-S-2150 manufactured by Hitachi Ltd. and HORIBA Ltd.).

TABLE 4

| | Raw material | Moisture percentage in dehydration process % | Temperature in drying process °C. | Moisture percentage in calcined process % | Particle diameter μm | Mass proportion % |
|---|---|---|---|---|---|---|
| Example 16 | Deinked froth | 40 | 100 | 2 | 400 | 70 |
| Example 17 | Deinked froth | 50 | 200 | 20 | 2000 | 85 |
| Example 18 | Deinked froth | 60 | 120 | 3 | 500 | 72 |
| Example 19 | Deinked froth | 70 | 180 | 15 | 1800 | 82 |
| Example 20 | Deinked froth | 50 | 130 | 3 | 500 | 81 |
| Example 21 | Deinked froth | 50 | 130 | 10 | 1800 | 85 |

TABLE 4-continued

| | | | | | | |
|---|---|---|---|---|---|---|
| Example 22 | Deinked froth | 50 | 170 | 3 | 600 | 82 |
| Example 23 | Deinked froth | 60 | 130 | 3 | 500 | 81 |
| Example 24 | Deinked froth | 60 | 170 | 10 | 800 | 84 |
| Example 25 | Deinked froth | 60 | 170 | 10 | 800 | 84 |
| Comparative example 8 | Deinked froth | 30 | 100 | 1 | 350 | 87 |
| Comparative example 9 | Deinked froth | 80 | 200 | 25 | 2200 | 65 |
| Comparative example 10 | Deinked froth | 50 | 200 | 25 | 2100 | 67 |
| Comparative example 11 | Paper sludge | 50 | 170 | 19 | 2100 | 80 |

| | Calcined process | | Quality | | | |
|---|---|---|---|---|---|---|
| | Unburnt amount in first calcined process % | Burning temperature in second calcined process °C. | Wire wearing g/m² | Productivity | Stability of quality | Appearance |
| Example 16 | 5 | 500 | 44 | ○ | ○ | White |
| Example 17 | 30 | 700 | 300 | ○ | ○ | White |
| Example 18 | 7 | 510 | 46 | ⊚ | ○ | White |
| Example 19 | 28 | 700 | 280 | ○ | ○ | White |
| Example 20 | 7 | 510 | 47 | ⊚ | ⊚ | White |
| Example 21 | 28 | 680 | 270 | ○ | ○ | White |
| Example 22 | 8 | 550 | 48 | ⊚ | ⊚ | White |
| Example 23 | 7 | 580 | 51 | ⊚ | ⊚ | White |
| Example 24 | 20 | 650 | 150 | ⊚ | ⊚ | White |
| Example 25 | 21 | 680 | 160 | ⊚ | ⊚ | White |
| Comparative example 8 | 3 | 500 | 200 | X | Δ | White |
| Comparative example 9 | 40 | 800 | 460 | X | Δ | Gray |
| Comparative example 10 | 38 | 780 | 470 | X | Δ | Gray |
| Comparative example 11 | 42 | 780 | 480 | Δ | X | Gray |

<Paper Containing the Regenerated Particle Aggregate>

The regenerated particle aggregate concerning the present invention was added to the pulp raw materials of BPGW (30 mass %), NBKP (30 mass %), LBKP (25 mass %), DIP (15 mass %) to obtain papers containing the fillers each having a basis weight of 35 to 280 g/m². Alternatively, regenerated particles that use paper sludge as raw materials were also shown as a comparative example.

These papers containing the fillers were evaluated for various kinds of quality and physical properties. Table 5 and Table 6 show results. Measurement, analysis, and evaluation were carried out as follows.

(18) Mass proportion. The mass proportion having a diameter more than 2000 μm was evaluated by a sieve of 4.7 meshes, and the mass proportion having a diameter less than 355 μm was evaluated by a sieve of 42 meshes, and the mass proportion in the entrance of the calcined process was measured.

(19) Mass analysis of a value in terms of oxides. Component analysis in terms of oxides was conducted by an X-ray microanalyser (EMAX-S-2150 manufactured by Hitachi Ltd. and HORIBA Ltd.)

CaO, SiO$_2$, and Al$_2$O$_3$ in Table 6 show the ratio of three ingredients in the particle component, and "sum total content ratio" in Table 6 shows the sum total content ratio of the three ingredients in the particles.

TABLE 5

| | Raw material | Moisture percentage in dehydration process % | Temperature in drying process °C. | Moisture percentage in calcined process entrance % | Silica precipitation treatment process | Particle diameter μm | Mass proportion % |
|---|---|---|---|---|---|---|---|
| Example 26 | Deinked froth | 40 | 100 | 2 | | 400 | 70 |
| Example 27 | Deinked froth | 50 | 200 | 20 | | 2000 | 85 |
| Example 28 | Deinked froth | 60 | 120 | 3 | | 500 | 72 |
| Example 29 | Deinked froth | 70 | 180 | 15 | | 1800 | 82 |
| Example 30 | Deinked froth | 50 | 130 | 3 | | 500 | 81 |
| Example 31 | Deinked froth | 50 | 130 | 3 | | 500 | 81 |
| Example 32 | Deinked froth | 50 | 130 | 3 | | 500 | 81 |

TABLE 5-continued

| | | | | | | | |
|---|---|---|---|---|---|---|---|
| Example 33 | Deinked froth | 50 | 130 | 3 | | 500 | 81 |
| Example 34 | Deinked froth | 50 | 130 | 3 | | 500 | 81 |
| Example 35 | Deinked froth | 50 | 130 | 3 | | 500 | 81 |
| Example 36 | Deinked froth | 50 | 130 | 3 | | 500 | 81 |
| Example 37 | Deinked froth | 50 | 130 | 3 | | 500 | 81 |
| Example 38 | Deinked froth | 50 | 130 | 3 | | 500 | 81 |
| Example 39 | Deinked froth | 50 | 130 | 3 | ◯ | 500 | 81 |
| Example 40 | Deinked froth | 50 | 130 | 3 | ◯ | 500 | 81 |
| Example 41 | Deinked froth | 50 | 130 | 3 | ◯ | 500 | 81 |
| Example 42 | Deinked froth | 50 | 130 | 10 | | 1800 | 85 |
| Example 43 | Deinked froth | 50 | 170 | 3 | | 600 | 82 |
| Example 44 | Deinked froth | 60 | 130 | 3 | | 500 | 81 |
| Example 45 | Deinked froth | 60 | 170 | 10 | | 800 | 84 |
| Example 46 | Deinked froth | 60 | 170 | 10 | | 800 | 84 |
| Comparative example 12 | Paper sludge | 30 | 210 | 1 | | 350 | 87 |
| Comparative example 13 | Paper sludge | 80 | 150 | 26 | | 2300 | 65 |
| Comparative example 14 | Paper sludge | 50 | 150 | 24 | | 2200 | 67 |
| Comparative example 15 | Paper sludge | 50 | 170 | 21 | | 2200 | 80 |

| | Unburnt amount in first calcined process % | Unburnt amount in second calcined process °C. | Wire wearing g/m² | Productivity | Stability of quality | Appearance |
|---|---|---|---|---|---|---|
| Example 26 | 5 | 500 | 44 | ◯ | ◯ | White |
| Example 27 | 30 | 700 | 300 | ◯ | ◯ | White |
| Example 28 | 7 | 510 | 46 | ◉ | ◯ | White |
| Example 29 | 28 | 700 | 280 | ◯ | ◯ | White |
| Example 30 | 7 | 510 | 47 | ◉ | ◉ | White |
| Example 31 | 7 | 510 | 47 | ◉ | ◉ | White |
| Example 32 | 7 | 510 | 47 | ◉ | ◉ | White |
| Example 33 | 7 | 510 | 47 | ◉ | ◉ | White |
| Example 34 | 7 | 510 | 47 | ◉ | ◉ | White |
| Example 35 | 7 | 510 | 47 | ◉ | ◉ | White |
| Example 36 | 7 | 510 | 47 | ◉ | ◉ | White |
| Example 37 | 7 | 510 | 47 | ◉ | ◉ | White |
| Example 38 | 7 | 510 | 47 | ◉ | ◉ | White |
| Example 39 | 7 | 510 | 47 | ◉ | ◉ | White |
| Example 40 | 7 | 510 | 47 | ◉ | ◉ | White |
| Example 41 | 7 | 510 | 47 | ◉ | ◉ | White |
| Example 42 | 28 | 680 | 270 | ◯ | ◯ | White |
| Example 43 | 8 | 550 | 48 | ◉ | ◉ | White |
| Example 44 | 7 | 580 | 51 | ◉ | ◉ | White |
| Example 45 | 20 | 650 | 150 | ◉ | ◉ | White |
| Example 46 | 21 | 680 | 160 | ◉ | ◉ | White |
| Comparative example 12 | 4 | 460 | 200 | X | Δ | Gray |
| Comparative example 13 | 40 | 800 | 460 | X | Δ | White |
| Comparative example 14 | 38 | 780 | 470 | X | Δ | White |
| Comparative example 15 | 42 | 780 | 480 | Δ | X | White |

TABLE 6

| | CaO Mass % | SiO$_2$ Mass % | Al$_2$O$_3$ Mass % | Sum total content % | Average particle diameter μm | Peak height % | Oil absorbency cc | Basis weight g/m² |
|---|---|---|---|---|---|---|---|---|
| Example 26 | 59 | 21 | 20 | 96 | 6.0 | 36 | 76 | 64 |
| Example 27 | 59 | 20 | 21 | 96 | 5.6 | 38 | 38 | 64 |
| Example 28 | 59 | 22 | 18 | 96 | 5.8 | 34 | 51 | 64 |
| Example 29 | 62 | 20 | 18 | 96 | 6.4 | 38 | 45 | 64 |
| Example 30 | 60 | 21 | 19 | 96 | 5.8 | 37 | 52 | 35 |
| Example 31 | 30 | 35 | 35 | 95 | 0.1 | 35 | 85 | 45 |
| Example 32 | 40 | 30 | 30 | 95 | 0.5 | 35 | 40 | 64 |
| Example 33 | 50 | 25 | 25 | 95 | 1.0 | 30 | 43 | 82 |
| Example 34 | 60 | 20 | 20 | 90 | 1.0 | 35 | 44 | 120 |
| Example 35 | 82 | 9 | 9 | 95 | 10.0 | 35 | 32 | 280 |
| Example 36 | 59 | 20 | 21 | 95 | 2.0 | 40 | 45 | 64 |
| Example 37 | 58 | 21 | 21 | 98 | 3.0 | 43 | 45 | 64 |
| Example 38 | 61 | 22 | 17 | 95 | 4.0 | 40 | 50 | 64 |

TABLE 6-continued

| | | | | | | | | |
|---|---|---|---|---|---|---|---|---|
| Example 39 | 30 | 55 | 15 | 95 | 8.5 | 35 | 100 | 64 |
| Example 40 | 36 | 29 | 35 | 95 | 8.2 | 30 | 90 | 64 |
| Example 41 | 51 | 40 | 9 | 95 | 8.7 | 30 | 95 | 64 |
| Example 42 | 60 | 20 | 20 | 96 | 5.8 | 36 | 48 | 64 |
| Example 43 | 60 | 20 | 20 | 96 | 6.6 | 34 | 50 | 64 |
| Example 44 | 60 | 20 | 20 | 96 | 7.8 | 36 | 51 | 64 |
| Example 45 | 60 | 20 | 20 | 96 | 5.8 | 35 | 52 | 64 |
| Example 46 | 60 | 20 | 20 | 96 | 6.2 | 32 | 51 | 64 |
| Comparative example 12 | 25 | 30 | 45 | 92 | 6.8 | 21 | 35 | 64 |
| Comparative example 13 | 90 | 5 | 5 | 91 | 7.2 | 23 | 24 | 64 |
| Comparative example 14 | 35 | 38 | 27 | 87 | 7.1 | 25 | 31 | 64 |
| Comparative example 15 | 25 | 41 | 34 | 79 | 8.1 | 25 | 110 | 64 |

| | Density g/cm³ | Ash content % | Printing part clearness | Smoothness Second | Ink print through | Brightness % | Opacity % | Paper dust |
|---|---|---|---|---|---|---|---|---|
| Example 26 | 0.80 | 16 | ○ | 48 | ○ | 82.4 | 82.9 | ◎ |
| Example 27 | 0.82 | 17 | ○ | 46 | ○ | 84.8 | 80.2 | ◎ |
| Example 28 | 0.82 | 16 | ◎ | 47 | ◎ | 82.5 | 82.6 | ○ |
| Example 29 | 0.83 | 16 | ◎ | 46 | ○ | 84.5 | 80.2 | ○ |
| Example 30 | 0.90 | 30 | ○ | 50 | ○ | 82.8 | 79.6 | ○ |
| Example 31 | 0.85 | 25 | ○ | 51 | ○ | 83.1 | 80.1 | ◎ |
| Example 32 | 0.80 | 5 | ○ | 46 | ○ | 83.5 | 90.5 | ○ |
| Example 33 | 0.93 | 15 | ○ | 45 | ○ | 83.6 | 93.2 | ○ |
| Example 34 | 0.74 | 20 | ○ | 35 | ◎ | 84.1 | — | ○ |
| Example 35 | 0.75 | 10 | ○ | 30 | ◎ | 84.3 | — | ○ |
| Example 36 | 0.82 | 16 | ○ | 47 | ○ | 84.1 | 81.0 | ○ |
| Example 37 | 0.85 | 15 | ○ | 47 | ○ | 84.1 | 80.7 | ○ |
| Example 38 | 0.86 | 17 | ○ | 49 | ○ | 84.2 | 80.6 | ○ |
| Example 39 | 0.80 | 16 | ○ | 51 | ○ | 83.4 | 81.1 | ○ |
| Example 40 | 0.82 | 16 | ○ | 52 | ○ | 84.5 | 80.8 | ○ |
| Example 41 | 0.81 | 17 | ○ | 47 | ○ | 83.4 | 80.9 | ○ |
| Example 42 | 0.81 | 16 | ○ | 52 | ○ | 83.6 | 81.0 | ○ |
| Example 43 | 0.82 | 16 | ○ | 46 | ○ | 84.3 | 80.2 | ○ |
| Example 44 | 0.83 | 15 | ◎ | 47 | ◎ | 84.4 | 82.5 | ○ |
| Example 45 | 0.82 | 16 | ○ | 53 | ◎ | 84.5 | 81.3 | ○ |
| Example 46 | 0.83 | 17 | ○ | 49 | ◎ | 84.5 | 82.3 | ○ |
| Comparative example 12 | 0.89 | 16 | △ | 45 | X | 81.1 | 79.7 | ○ |
| Comparative example 13 | 0.88 | 17 | X | 43 | X | 82.1 | 79.9 | X |
| Comparative example 14 | 0.92 | 16 | X | 44 | △ | 81.8 | 78.4 | X |
| Comparative example 15 | 0.91 | 16 | X | 42 | △ | 81.7 | 78.5 | X |

<Coated Paper for Printing Having a Coating of the Regenerated Particle Aggregate Thereon>

Examples and comparative examples will be described in detail with reference to examples having two layers of the coating layer.

Example 47

Firstly, a regenerated particle aggregate according to claim 5 of the invention in this application was manufactured.

Next, on one hand, 20 parts by weight of the regenerated particle aggregates with respect to all the pigment (all the pigments in the coating liquid for the uppermost surface coating layer formation) 100 parts by weight, 50 parts by weight of heavy calcium carbonate (average particle diameter of 1.4 μm) with respect to all the pigment 100 parts by weight, and 30 parts by weight of clay (average particle diameter of 0.8 μm) with respect to all the pigment 100 parts by weight were blended together as a pigment. An amount of 5 parts by weight of a styrene butadiene latex (acrylonitrile content. 5% by weight, Tg. −10° C., average particle diameter. 130 nm, gel content. 85%) with respect to all the pigment 100 parts by weight, as a binder, and 5 parts by weight of a urea phosphoric acid starch with respect to all the pigment 100 parts by weight were blended. An amount of 0.08 parts by weight of an acrylic acid-acrylamide copolymer with respect to all the pigment 100 parts by weight was blended to the obtained mixture, and was dispersed to prepare a coating liquid for the upper side coating layer (coating liquid for uppermost surface coating layer formation) having 50% of solid concentration.

On the other hand, 100 parts by weight of calcium carbonate with an average particle diameter of 11 μm as a pigment, 0.1 parts of "Aaron T-40" manufactured by Toagosei Co., Ltd. as a polyacrylic dispersant, 9 parts of "L 1301" manufactured by Asahi Chemical Co., Ltd. as a styrene butadiene series latex, 1.0 part of "MS4600" manufactured by NIHON SHOKUHIN KAKO CO., LTD as a phosphorylated starch, and 0.4 parts of calcium stearate as a lubricant were blended together to prepare a coating liquid for under side coating layer having 60% of solid concentration.

Subsequently, the coating liquid for under side coating layer was coated to both sides of the base paper (paper base) having a basis weight of 62 g/m² with a coating amount of 8 g/m², and then dried to form an under side coating layer (lower layer), to both sides of the base paper. In addition, the coating liquid for the upper side coating layer was coated with a coating amount of 8 g/m² on each under side coating layer and dried to form an upper side layer (uppermost surface coating layer). In this way, a target coated paper for printing was manufactured. Table 7 and Table 8 show specifications of Example 47. Table 7 and Table 8 show specifications of each example. Except for conditions shown in these Tables, coated papers for printing of Examples 47 to 56 were manufactured in the same manner as that in example 1 by the method according to claim 5.

Comparative Examples 16 to 20

Table 7 and Table 8 show specifications of each example. Except for conditions shown in these Tables, coated papers for printing of comparative examples 16 to 20 were manufactured in the same manner as that in example 1 by the method according to claim 5.

The contents of each item in Table 7 and Table 8 are shown hereinafter.

The number of part (C) represents a part by weight of the regenerated particle aggregate to all the pigment (all the pigments in the uppermost surface coating layer) 100 parts by weight, the number of part (A) represents a part by weight of the heavy calcium carbonate to all the pigment (all the pigments in the uppermost surface coating layer) 100 parts by weight, and the number of part (B) represents a part by weight of the clay to all the pigment (all the pigments in the uppermost surface coating layer) 100 parts by weight. Incidentally, the mixed amount of the styrene butadiene latex as a binder is not shown in the Tables, but 5 parts by weight (5 parts by weight with respect to all the pigment 100 parts by weight) was used in all the examples 47 to 56 and comparative examples 16 to 20. The numbers of part of the esterified starch in the Tables represent parts by weight to all the pigment 100 parts by weight in the uppermost surface coating layer. Furthermore, the number of parts of the acrylic acid and the acrylamide copolymer also represents a part by weight to all the pigment 100 parts by weight in the uppermost surface coating layer.

The average particle diameter in the Table 8 means a volume weighted mean particle diameter measured with Microtruck 7995-30SPA type manufactured by Leeds & Northrop Corp.

Evaluation methods of quality will be described hereinafter.

(19) Glossiness in piling print. The sample was printed using the Roland offset press, and was kept standing at a room temperature a whole day and night. The solid-printed parts with four-color pile printing in black, magenta, cyan, and yellow of the sample were measured for a gloss at an angle of 60°. (Unit. %)

(20) Ink adherability. Printing was performed using a commercial oxidation polymerization type printing ink using an RI press (AKIRA WORKS), and the uniformity and consistency of the printing surface were visually judged by the following criterion by four-step evaluation.

◉. excellent
○. better
Δ. some problems
X. not acceptable

Allowable limit is not less than Δ. The expression, as used herein, "○-Δ" means that an evaluation ○ and Δ are mixed.

(21) Coater operability. The finishing coating liquid was applied on the paper base, using a blade coater, and the situation of generation of streak in the coater head section was observed. Visual judgment was carried out by four-step evaluation. Allowable limit is not less than Δ. Evaluation was performed on the following criteria, using streak, scratch, and the flowability of the coating liquid in blade coating as an index.

◉. excellent
○. better
Δ. a little inferior
X. inferior

The expression, as used herein, "○-Δ" means that an evaluation ○ and Δ are mixed.

TABLE 7

| | Uppermost surface coating layer | | | | | | | | | |
|---|---|---|---|---|---|---|---|---|---|---|
| | Pigment | | | | | | | | | |
| | Calcium carbonate | Clay | | Regenerated pigment | | | | | | |
| (Unit) | Number of part (A) Parts by weight | Number of part (B) Parts by weight | Average particle diameter μm | Number of part (C) Parts by weight | Average particle diameter μm | $Al_2O_3$ % | $SiO_2$ % | CaO % | Others % | (A) + (C) Parts by weight |
| Example 47 | 50 | 30 | 0.8 | 20 | 5 | 8 | 10 | 81 | 1 | 70 |
| Example 48 | 50 | 40 | 0.8 | 10 | 3 | 9 | 30 | 60 | 1 | 60 |
| Example 49 | 25 | 50 | 0.8 | 25 | 8 | 20 | 15 | 40 | 5 | 50 |
| Example 50 | 20 | 60 | 0.8 | 20 | 5 | 21 | 20 | 50 | 9 | 40 |
| Example 51 | 20 | 70 | 0.8 | 10 | 5 | 10 | 40 | 45 | 5 | 30 |
| Example 52 | 30 | 40 | 0.8 | 30 | 5 | 20 | 30 | 45 | 5 | 60 |
| Example 53 | 30 | 30 | 0.8 | 40 | 5 | 20 | 30 | 45 | 5 | 70 |
| Example 54 | 30 | 30 | 0.8 | 40 | 5 | 25 | 20 | 50 | 5 | 70 |
| Example 55 | 30 | 30 | 0.8 | 40 | 0.1 | 30 | 35 | 35 | 5 | 70 |
| Example 56 | 30 | 30 | 0.8 | 40 | 10 | 35 | 40 | 20 | 5 | 70 |
| Comparative example 16 | 10 | 10 | 0.8 | 80 | 5 | 45 | 40 | 10 | 5 | 90 |
| Comparative example 17 | 80 | Without addition | Without addition | 20 | 5 | 30 | 45 | 20 | 5 | 100 |
| Comparative example 18 | 50 | 10 | 0.8 | 40 | 0.05 | 45 | 40 | 10 | 5 | 90 |

TABLE 7-continued

Uppermost surface coating layer

| | Pigment | | | | | | | | | |
|---|---|---|---|---|---|---|---|---|---|---|
| | Calcium carbonate | Clay | | Regenerated pigment | | | | | | |
| (Unit) | Number of part (A) Parts by weight | Number of part (B) Parts by weight | Average particle diameter μm | Number of part (C) Parts by weight | Average particle diameter μm | Al$_2$O$_3$ % | SiO$_2$ % | CaO % | Others % | (A) + (C) Parts by weight |
| Comparative example 19 | 50 | 10 | 0.8 | 40 | 12 | 5 | 30 | 60 | 5 | 90 |
| Comparative example 20 | 50 | 10 | 0.8 | 40 | 12 | 10 | 10 | 75 | 5 | 90 |

TABLE 8

Uppermost surface coating layer

| | | Esterified starch | | Quality evaluation | | | |
|---|---|---|---|---|---|---|---|
| | Acrylamido | | Number of | Printability | | | |
| (Unit) | acrylate copolymer Number of part Parts by weight | Type | part Parts by weight | White paper glossiness % | Glossiness in piling print % | Ink adherability | Coater operability |
| Example 47 | 0.08 | Urea phosphoric acid starch | 5 | 54 | 80 | ○ | ○ |
| Example 48 | 0.08 | Urea phosphoric acid starch | 5 | 58 | 81 | ○~Δ | ○ |
| Example 49 | 0.01 | Urea phosphoric acid starch | 5 | 63 | 83 | ○~Δ | ○ |
| Example 50 | 0.1 | Urea phosphoric acid starch | 5 | 65 | 84 | ○ | ○~Δ |
| Example 51 | 0.08 | Urea phosphoric acid starch | 5 | 68 | 85 | ○ | ○~Δ |
| Example 52 | 0.08 | Urea phosphoric acid starch | 5 | 60 | 82 | ○~Δ | ○ |
| Example 53 | 0.08 | Urea phosphoric acid starch | 5 | 57 | 81 | ○ | ○~Δ |
| Example 54 | 0.08 | Urea phosphoric acid starch | 0.5 | 54 | 80 | ○~Δ | ○~Δ |
| Example 55 | 0.08 | Urea phosphoric acid starch | 10 | 51 | 82 | ○~Δ | ○~Δ |
| Example 56 | 0.08 | Urea phosphoric acid starch | 5 | 50 | 80 | ○ | ○~Δ |
| Comparative example 16 | 0.08 | Urea phosphoric acid starch | 5 | 48 | 78 | X | Δ |
| Comparative example 17 | 0.08 | Urea phosphoric acid starch | 5 | 38 | 68 | Δ | Δ |
| Comparative example 18 | 0.08 | Urea phosphoric acid starch | 5 | 44 | 74 | Δ | Δ |
| Comparative example 19 | 0.08 | Without addition | — | 52 | 65 | ○~Δ | X |
| Comparative example 20 | 0.08 | Urea phosphoric acid starch | 5 | 42 | 72 | Δ | Δ |

As Table 7 and Table 8 show, offset printing etc. were actually performed to the coated papers for printing with respect to each examples 47 to 56 and comparative examples 16 to 20 for evaluation. According to comprehensive judgments for each evaluation items, examples gave evaluations higher than those in comparative examples.

The invention claimed is:

1. A method for manufacturing a regenerated particle aggregate usable as a filler or pigment for paper making, the regenerated particle aggregate being obtained through a dehydration process, a drying process, a calcined process, and a pulverization process of a main raw material using a deinked froth separated from a pulp fiber in a deinking process of manufacturing recycled pulp as the main raw material, wherein a moisture percentage of the raw material after the dehydration process is set to 2 to 20 mass % in the drying process, and the calcined process includes at least two steps of calcined processes of a first stage calcining furnace of a cyclone type, and a second stage calcining furnace following the first stage calcining furnace, the second stage calcining furnace having a furnace temperature lower than a temperature in a top portion of the first stage calcining furnace.

2. The method for manufacturing a regenerated particle aggregate according to claim 1, wherein not less than 70 mass % of the dried material from the drying process before the calcined process by the first stage calcining furnace is set to a particle diameter of 355 to 2000 μm.

3. The method for manufacturing a regenerated particle aggregate according to claim 1 or 2, wherein an unburnt amount is set to 5 to 30% in burning and calcination in the first stage calcining furnace, and the unburnt amount is burnt and calcined in the second stage calcining furnace following the first stage calcining furnace.

4. The method for manufacturing a regenerated particle aggregate according to claim 1 or 2, wherein the temperature in the top portion of the first stage calcining furnace is set to 510 to 750° C., the temperature of the second stage calcining furnace is set lower than the temperature in the top portion of the first stage calcining furnace, and the temperature of the second stage calcining furnace is set to 500 to 700° C.

5. The method for manufacturing a regenerated particle aggregate according to claim 1 or 2, wherein at least a pair of rolls for mixing up a raw material, and hot air spraying means for spraying hot air upwards are provided as drying means in the drying process.

* * * * *